United States Patent
Jin et al.

(10) Patent No.: US 8,056,138 B2
(45) Date of Patent: Nov. 8, 2011

(54) SYSTEM, METHOD, AND SERVICE FOR DETECTING IMPROPER MANIPULATION OF AN APPLICATION

(75) Inventors: Hongxia Jin, Cupertino, CA (US); Ginger Myles, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 11/066,934

(22) Filed: Feb. 26, 2005

(65) Prior Publication Data
US 2006/0195906 A1 Aug. 31, 2006

(51) Int. Cl.
G06F 7/04 (2006.01)
(52) U.S. Cl. .......................................................... 726/26
(58) Field of Classification Search ...................... 726/26
See application file for complete search history.

(56) References Cited

U.S. PATENT DOCUMENTS

| | | | |
|---|---|---|---|
| 6,000,030 A | 12/1999 | Steinberg et al. ............. | 713/200 |
| 6,006,328 A | 12/1999 | Drake ........................... | 713/200 |
| 6,643,775 B1 | 11/2003 | Granger et al. ............... | 713/190 |
| 6,976,167 B2 * | 12/2005 | Nenashev ...................... | 713/168 |
| 7,430,670 B1 * | 9/2008 | Horning et al. ............... | 713/190 |
| 7,460,670 B1 * | 12/2008 | Elliott ........................... | 380/256 |
| 2002/0199100 A1 | 12/2002 | Nenashev ...................... | 713/161 |
| 2003/0023856 A1 | 1/2003 | Horne et al. .................. | 713/187 |
| 2003/0099358 A1 | 5/2003 | Michael et al. ............... | 380/270 |
| 2003/0217280 A1 * | 11/2003 | Keaton et al. ................. | 713/193 |
| 2005/0021989 A1 * | 1/2005 | Johnson et al. ............... | 713/194 |
| 2005/0108562 A1 * | 5/2005 | Khazan et al. ................ | 713/200 |

* cited by examiner

Primary Examiner — Nasser Moazzami
Assistant Examiner — Daniel Hoang
(74) Attorney, Agent, or Firm — Shimokaji & Associates, P.C.

(57) ABSTRACT

A piracy protection system incorporates tamper detection capabilities into a protected copy of an application by disassembling a statically linked binary of the application, modifying some of the instructions in the application, and then rewriting all of the modified and unmodified instructions to a new executable file, a protected copy. The piracy protection system comprises an offline tamper detection technique in which the software itself detects the tampering and causes the program to fail, therefore protecting itself from malicious attacks. The system further comprises a dynamic software-watermarking process that incorporates code obfuscation to prevent reverse engineering.

12 Claims, 15 Drawing Sheets

```
805                                          810
↓                                            ↓ push ebp                                     push ebp
mov ebp, esp                                 mov ebp, esp
push ecx                                     push ecx
mov dword ptr [ebp-04h], 0h                  mov dword ptr [ebp-04h], 0h
  jmp L2            815                        call branch_function_1    820
L1:                                          mov eax, [ebp-04h]
  mov eax, [ebp-04h]                         add eax, 01h
  add eax, 01h                               mov [ebp-04h], eax
  mov [ebp-04h], eax                         cmp dword ptr [ebp-04h], 05h
L2:                                            call branch_function_2    830
  cmp dword ptr [ebp-04h], 05h               mov ecx, [ebp-04h]
  jge L3            825                      push ecx
  mov ecx, [ebp-04h]                         push "this is i"
  push ecx                                     call branch_function_3    840
  push "this is i"                           add esp, 08h
    call printf        835                     call branch_function_1    850
  add esp, 08h                               mov esp, ebp
  jmp L1                                     pop ebp
L3:                  845                     ret
  mov esp, ebp
  pop ebp
  ret
```

FIG. 8

SYSTEM, METHOD, AND SERVICE FOR DETECTING IMPROPER MANIPULATION OF AN APPLICATION

FIELD OF THE INVENTION

The present invention generally relates to protection of software applications through fingerprinting, water marking, or tamper detection. More particularly, the present invention pertains to a software protection technique that dynamically detects tampering by incorporating integrity checks into specially constructed branch functions.

BACKGROUND OF THE INVENTION

Software piracy costs the software industry billions of dollars in lost revenue every year. One attack that often results in considerable lost revenue occurs when an adversary is able to remove a license check. Once the license check has been circumvented, the attacker is able to freely redistribute the software. Of further concern is protecting client-side software running on a potentially hostile host. Since the host has full control over the execution of the software, a sufficiently determined attacker can completely break any piece of software given sufficient time, effort, or resources.

The problem of protecting software from malicious tampering and reverse engineering has been the focus of considerable research. A variety of techniques have been proposed such as software watermarking, code obfuscation, and tamper detection. Each of these techniques addresses the issue of piracy in a different way and often these techniques can be combined to provide an even stronger defense. For example, software watermarking is generally vulnerable to semantics-preserving transformations. Incorporating tamper-proofing techniques can thwart such an attack. Certain tamper-proofing techniques require outside resources to detect that a violation has occurred. In the case of software watermarking, a suspected illegal copy is obtained and a recognizing tool applied to the software to extract the watermark.

The issue of software protection can be addressed from either a software or hardware-based approach. Hardware-based techniques generally offer a higher level of protection but with the cost of additional expenses for the developer and user inconvenience. Additionally, software is often purchased and distributed over the Internet, making the use of hardware-based techniques (i.e., dongles or smartcards) infeasible. The use of tamperproof CPUs is another hardware-based solution. However, this type of hardware is not widely in use.

Software-based approaches address the issues of cost and user convenience. However, an adversary can often easily circumvent software-based approaches to protection. Two of the most well known software-based techniques are code obfuscation and software watermarking. Code obfuscation transforms the code of a software product in such a way that it is harder for the attacker to understand and reverse engineer. Software watermarking discourages the adversary from illegally copying and redistributing the software by embedding a unique identifier in the code of the software product. Depending on the type of identifier embedded, the watermark can further be used as proof of authorship or purchase. The proof of purchase is used as a "fingerprint" to uniquely identify a purchaser with one copy of a software product. Embedding a proof of purchase, a fingerprint, has the advantage that the source of the illegal distribution can be identified.

Software-based techniques further comprise tamper detection and tamper proofing. Many conventional tamper-detection or tamper-proofing techniques require accessing outside resources such as a periodic connection to a clearinghouse. One conventional technique makes use of an event log that is periodically transmitted to the clearinghouse. Integrity checks are imbedded throughout an application or program. The event log records the results of the integrity checks. When the clearinghouse detects tampering, the user can be blocked from receiving future content such as updates. While this technique has proven to be effective, the use of the clearinghouse is awkward for the user and can be circumvented. Detection of tampering requires the attacker to contact the clearinghouse. Further, even if the tampering is detected, the attacker may still have a functioning application.

Other conventional tamper-detection or tamper-proofing systems comprise self-contained software-based tamper proofing. One conventional technique comprises an algorithm based on integrity verification kernels (IVK). Integrity verification kernels are units of code responsible for performing critical program functions. Each integrity verification kernel is split into smaller blocks of code that are individually encrypted. Execution of each block of code comprises the following steps: decrypting the block of code, executing the block of code, then re-encrypting the block of code. To detect tampering, the sum of the hash of all previously executed blocks of code is checked at each step to verify that the blocks of code were executed correctly and in proper order.

Another conventional technique establishes a network of guards. These guards establish a check and balance system such that each guard monitors or repairs a different section of code. For example, one guard verifies the integrity of a block of code while another guard repairs the block of code when the block of code has been compromised.

The growing concern regarding software piracy can be attributed to a variety of factors such as the distribution of software in architectural-neutral formats that are easy to manipulate and the ease of sharing over the Internet. In previous years piracy was limited by the necessity to physically transfer a piece of software on a floppy disk or CD-ROM. With the increases in bandwidth of the Internet, physical transfer is no longer necessary.

In the event that a software program is illegally redistributed or an important algorithmic secret is stolen, an owner may wish to take action against the theft. This requires demonstration of ownership or identification of the source of the piracy through the use of techniques such as software watermarking. Software watermarking is used to embed a unique identifier in a piece of software to encode identifying information. While this technique does not prevent piracy, it does provide a way to prove ownership of pirated software and, in some cases, identify the original purchaser prior to the piracy. However, software watermarking is required to be resilient against a variety of attacks such as semantics-preserving code transformations and program analysis tools in order to be useful.

Another conventional approach to limiting piracy and theft of software is fingerprinting; i.e., providing within the software a proof of purchase uniquely tied to a purchaser. However, fingerprinting software to trace piracy has not been a viable option for many software developers. One drawback to fingerprinting is that current techniques require companies to alter distribution methods. Using conventional fingerprinting techniques, the fingerprint mark cannot be tied to a purchaser using conventional watermarking techniques and pre-packaged software.

Software watermarking discourages piracy through the attachment of an identifying mark. An authorship mark is a watermark embedded in every copy of the application to identify the author. A software developer uses the authorship mark to prove ownership of pirated software. Both the watermark and the authorship mark are required be robust against tampering in order to be effective. However, only the fingerprint mark requires invisibility. In specific instances, it may be desirable for the authorship mark to be visible, e.g. the authorship mark conveys a level of quality. In instances where the mark is used in a potentially hostile environment to protect a secret or for tracing piracy, invisibility may increase the strength of the mark.

Conventional watermarking techniques comprise any one or more of: a blind watermarking algorithm, an informed watermarking algorithm, a static watermarking algorithm, and a dynamic watermarking algorithm. For both blind and informed watermarking algorithms, the watermarked program and a secret key are required to extract the watermark. However, with an informed watermarking algorithm, a version of the program that is not watermarked or the embedded mark are also required to extract the watermark. A static watermarking algorithm uses the static code and data of the program to embed and recognize the watermark. A dynamic algorithm makes use of information gathered from the execution of the program to embed and recognize the watermark.

Embedding techniques used in conventional software watermarking can be categorized based on how the application is manipulated to encode the watermark. In one embedding technique, semantics-preserving transformations are applied to reorder the code. The particular order chosen represents the watermark. In another embedding technique, the watermark is encoded in a section of code injected in the application that does not contribute to the functionality of the application. In a further embedding technique, the frequency of instructions is altered to encode the watermark.

One conventional static watermarking technique embeds a watermark through an extension to a control flow graph. The watermark is encoded in a sub-graph that is incorporated into the original control flow graph. Another conventional static watermarking technique modifies the instruction frequencies of the original program to embed the watermark. A further conventional static watermarking technique comprises a very stealthy, but fragile, algorithm that makes use of a graph-coloring problem to embed the watermark in a register allocation. However, the watermark of conventional static watermarking techniques can typically be destroyed by basic code optimization or obfuscation techniques.

One conventional dynamic watermarking technique embeds a watermark in the structure of a graph that is built on the heap at runtime as the application program executes on a particular input. Another conventional dynamic watermarking technique makes use of an abstract interpretation framework to embed a watermark in the values assigned to integer local variables during program execution. A further dynamic watermarking technique is path-based and relies on the dynamic branching behavior of the program. To embed the watermark, the sequence of branch instructions taken and not taken on a particular input is modified. Variations for this algorithm were developed to target the varied capabilities of Java bytecode and native executables. Yet another dynamic watermarking technique leverages the ability to execute blocks of code on different threads. The watermark is encoded in the choice of blocks executed on the same thread.

Some conventional watermarking techniques protect software watermarks through tamper proofing. One conventional approach includes a checksum with the watermark. However, an adversary who is able to discover the checksum algorithm can easily attack this technique. Another conventional approach protects a static watermark by encoding a portion of the code of the application in the static watermark. This encoded static watermark is then stored in some portion of the data of the program such as an image. Consequently, an attacker risks altering behavior of the application if the watermark is damaged.

Another conventional approach utilizes constant encoding to tamper proof a dynamic data structure watermarks. Constants in the application are replaced with a function dependent on a dynamic data structure that encodes the watermark. A further conventional approach utilizes error-correcting codes to repair minor damage to the watermark incurred through semantics-preserving transformations.

Although conventional tamper detection and watermarking technology has proven to be useful, it would be desirable to present additional improvements. Conventional software tamper detection techniques often require the use of special hardware or a periodic connection to a clearinghouse. Conventional watermarking techniques can be easily attacked through simple semantics-preserving transformations. Conventional watermarking techniques further require a software developer to choose between providing proof of ownership or tracing the source of the illegal redistribution. Further, a fingerprint mark cannot be tied to a purchaser using conventional watermarking techniques and pre-packaged software.

What is needed is a tamper detection technique that allows an application or program to self-diagnose improper manipulation. Further, a tamper detection technique is desired that causes an application to fail once a license check, watermark, or fingerprint has been removed or the application has been improperly manipulated in any other way. Furthermore, a watermarking technique is desired that allows a developer to concurrently prove authorship and fingerprint an application by tying the application to an individual purchaser through any distribution method such as, for example, as pre-packaged software, over the Internet, etc. What is therefore needed is a system, a service, a computer program product, and an associated method for detecting improper manipulation of an application. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for detecting improper manipulation of an application. The present system incorporates tamper detection capabilities into a protected copy of an application by disassembling a statically linked binary of the application, modifying some of the instructions in the application, and then rewriting all of the modified and unmodified instructions to a new executable file, a protected copy.

The present system comprises an offline tamper detection technique in which the software itself detects the tampering and causes the program to fail, therefore protecting itself from malicious attacks. The present system further comprises a dynamic software-watermarking process that incorporates code obfuscation (to aid in preventing reverse engineering) and tamper-detection (to thwart attacks such as the application of semantics-preserving transformations). The present system concurrently provides proof of ownership through an authorship mark and the capability to trace the source of an illegal redistribution through a fingerprint mark. The present system further provides a solution for distributing pre-packaged, fingerprinted software that is linked to the consumer. Advantageously, the present system is able to self-monitor without external devices.

A branch function is a special function used as an obfuscation technique to disrupt static disassembly of an application or other executable code. The present system converts some or all of the branch instructions in the application to call or control transfer instructions. This conversion is performed after the program is executed, a trace is obtained, and the dynamic information is obtained, then static analysis tools are used to modify the programming code of the application, in order to create a protected copy of the application for distribution. The present system determines a target displacement for each of the branch instructions replaced by a call instruction. This target displacement is stored in a displacement table.

Tampering is detected dynamically by incorporating integrity checks into specially constructed branch functions in the protected copy. A set of branch functions are developed, each of which performs a different integrity check to establish a self-checking system to monitor the protected copy. Through the use of integrity check modules, a check system can be established that enables self-monitoring of the entire program. The check system is configured such that one integrity check verifies that another has not been modified or removed.

A call instruction is used to call a branch function which could be an integrity check branch function or a fingerprint branch function depending on the situation. Within the branch function tampering is detected through the computation of the return address. If the program has been altered the integrity check will yield an incorrect value which will lead to the wrong slot in the displacement table being accessed. If the branch function is an integrity check branch function alteration of the call location will yield an incorrect slot in the displacement table. If the branch function is a fingerprint branch function and if the current key has been altered an incorrect slot in the displacement table will be accessed. In each case, the wrong displacement will be added to the return address. Upon function return, an incorrect instruction executes, eventually leading to program failure. The protected copy dynamically detects tampering through the computation of a cell or slot location in a displacement table, T. If either the call location or the integrity check is altered, an incorrect slot in the displacement table, T, is accessed. If the application has been improperly manipulated, an incorrect displacement is added to a return address of the original branch function. Upon function return, an incorrect instruction executes, eventually leading to program failure. Program failure is the desired result for tamper-detecting software.

The robustness of many conventional tamper-detection techniques suffers because the detection mechanism relies on a comparison or check between a calculated value and an expected value. This is considered a weaker form of detection since it is often easy for an attacker to remove the check. In the present system, the calculated value is used to control the execution of the program, eliminating an important vulnerability. Additionally, the use of the branch function increases the required analysis by the attacker since the proper control flow is not obvious.

The present system allows watermarking comprising both an author mark and a fingerprint mark in the protected copy. A watermarking module evolves and stores a fingerprint key. The order of the target displacements within the displacement table is customized to a particular generation of the fingerprint key; consequently, the application only executes with the specific user key. The present system emulates the performance of a dongle without the drawback of dongle distribution. Furthermore, a fingerprint key does not have to be stored in the application; rather, a fingerprint key can be distributed with the program and be required when the program is executed.

For example, when a user purchases an application, the user installs on a computer. During installation, the user is required to register over the Internet with the owner of the rights to the application; the application is inoperable until the registration process is complete. During the registration process, the present system ties a fingerprint mark in the application with the purchaser by imbedding some software in the program that enables the fingerprint capability functionality of the application.

The watermarking module comprises a conversion of branch instructions to a call instruction that calls a specifically constructed fingerprint branch function. This call function not only computes the fingerprint of the program but it also regulates execution of the program. Consequently, if an attacker attempts to remove the watermark embedded in an application by the present system, the resulting software is non-functional.

The present system utilizes an embedding technique for the watermark in which a section of code is added to the application. This code calculates the fingerprint mark as the program executes and contributes to the proper execution of the program.

The only static variation in differently watermarked instances of an application is in the displacement table stored in a data section of the application. Consequently, the present system resists collusive attacks. Furthermore, software companies can produce and distribute their software in a traditional manner. The purchased application is non-functional until the user installs the software and registers it with the software company. Upon registration, a user key and a displacement table are distributed, creating a fully functioning application.

Using conventional technology, a specific fingerprint mark can be tied to a purchaser only if the user purchased the software directly from the software company (e.g., over the Internet). The software is then fingerprinted after purchase but prior to shipping the application to the user. Through the use of the branch instruction-based watermark, distribution of fingerprinted software can be accomplished through prepackaged software sold at retail stores. Installation of a fully functioning copy of the application requires an initial Internet connection in a manner similar to the registration process required for most software.

The present system successfully thwarts both additive and distortive attacks. Furthermore, the present system is highly resistant to subtractive and collusive attacks. Conventional fingerprinting techniques address the prevention of the collusive attacks through the use of code obfuscation that introduces additional overhead. The only static variation introduced by the present system is in the displacement table. Consequently, the present system is resilient to collusive attacks without the use of obfuscation. The space cost associated with the present system is a very small percentage of the size of the application, especially for larger applications.

The present invention may be embodied in a utility program such as a piracy protection utility program. The present invention also provides means for the user to generate a protected copy of an application or other executable program by selecting an application to protect and specifying a set of requirements for the protected copy and then invoking the piracy protection utility program. The set of requirements comprises selection of an integrity check module, an authorship mark, or a fingerprint mark to be included in the protected copy. The present invention further provides means for identifying an embedded authorship mark or fingerprint mark in the protected copy.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 8 is a programming code listing illustrating an exemplary code transformation by the piracy protection system of FIGS. 1 and 2 from an original code to a protected code;

DETAILED DESCRIPTION OF PREFERRED EMBODIMENTS

The following definitions and explanations provide background information pertaining to the technical field of the present invention, and are intended to facilitate the understanding of the present invention without limiting its scope:

Deterministic Path: An execution path through an executable code such as an application that is executed each time the application is executed.

Non-deterministic Path: An execution path through an executable code such as an application that is not executed each time the application is executed such as, for example, portions of the executable code that reside in an if statement or an else statement.

Figure 1:
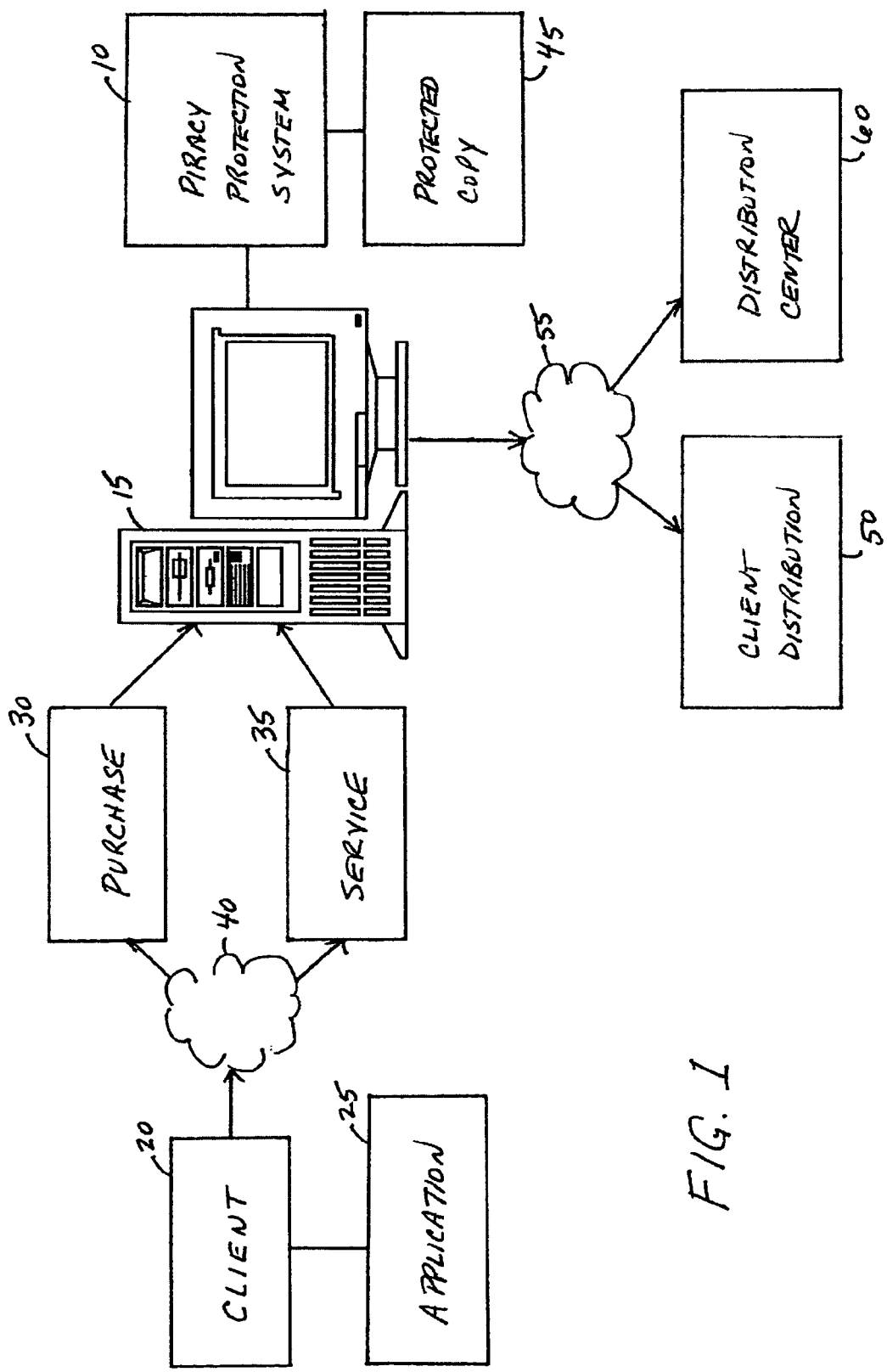
FIG. 1 is a schematic illustration of an exemplary operating environment in which a piracy protection system of the present invention can be used.

FIG. 1 portrays an exemplary overall environment in which a system, method, and service for detecting improper manipulation of an application (the piracy protection system 10 or "system 10") according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

A client 20 owns an application 25. While described in terms of application 25, system 10 can be applied to, for example, any executable programming code. Client 20 wishes to acquire piracy and tamper protection for application 25 through a transformation process executed by system 10. Client 20 contracts to utilize system 10 on application 25 by means of a purchase 30 or a service 35 through a network 40. Purchase 30 allows client 20 to purchase system 10 for operation on a server of client 20. In this case, server 15 is owned or otherwise operated by client 20. Alternatively, client 20 can acquire protection for application 25 through subscribing to service 35. In this case, server 15 is owned or otherwise operated by the owner of system 10 or an agent of the owner of system 10.

System 10 analyzes and transforms application 25, producing a protected copy 45 of application 25. Server 15 transfers the protected copy 45 to a client distribution 50 via network 55 for distribution of the protected copy 45 to users. Server 15 further transfers the protected copy 45 to a distribution center 60. The distribution center 60 comprises, for example, a store in which a user may purchase a pre-packaged version of the protected copy 45. The client distribution 50 comprises, for example, a web site operated by client 20 at which a user may purchase and download the protected copy 45.

Figure 2:
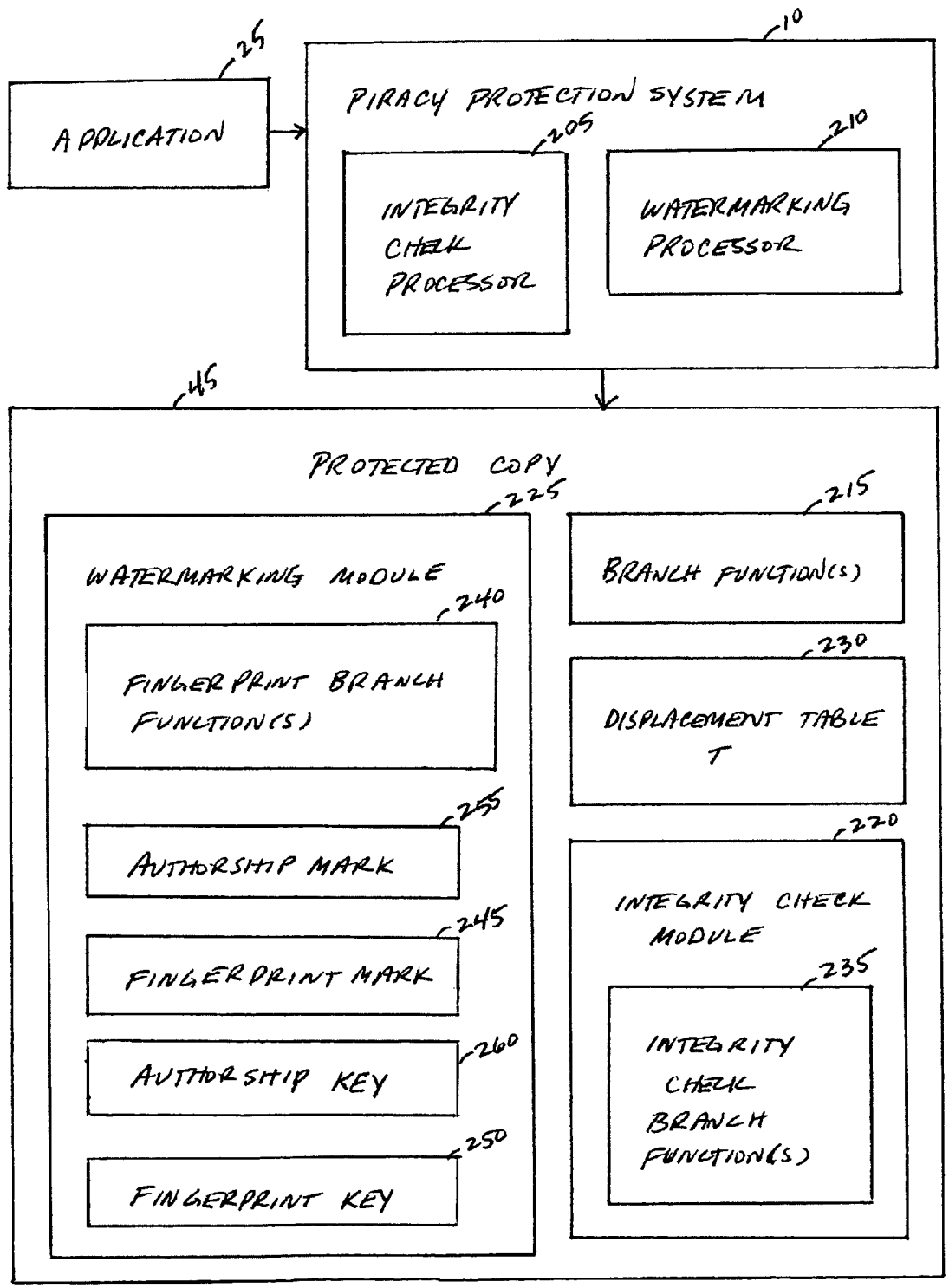
FIG. 2 is a block diagram of the high-level architecture of the piracy protection system of FIG. 1.

FIG. 2 illustrates a high-level hierarchy of system 10. System 10 comprises an integrity check processor 205 and a watermarking processor 210. The protected copy 45 comprises branch function(s) 215, an integrity check module 220, a watermarking module 225, and a displacement table, T, 230 (further referenced herein as table 230 or T 230).

The integrity check module 220 comprises integrity check branch function(s) 235. The integrity check processor 205 transforms one or more branch instructions in application 25 to calls to integrity check branch functions 235 in the protected copy 45. Each of the integrity check branch functions 235 access a cell or "slot" in table 230 to locate a target instruction of the branch instruction. Consequently, control flow is obfuscated by routing control flow through the integrity check module 220.

The watermarking module 225 comprises fingerprint branch function(s) 240. The watermarking processor 210 embeds a watermark by disassembling a statically linked binary of application 25, modifying the instructions of application 25 to generate the fingerprint branch functions 240, and then rewriting the instructions to a new executable file, the protected copy 45. The watermarking module 225 further comprises a fingerprint mark, FM, 245, one or more fingerprint keys 250, an authorship mark, and AM, 255.

The branch function 215 is a special function used as part of an obfuscation technique to disrupt static disassembly.

This obfuscation technique converts unconditional branch instructions to a call to the branch function 215 that is inserted in the protected copy 45. The purpose of the branch function 215 is to transfer the control of execution to the instruction that was the target of the unconditional branch instruction (further referenced herein as the target instruction). The branch function 215 can be designed to handle any number of unconditional or conditional branches.

Figure 3:
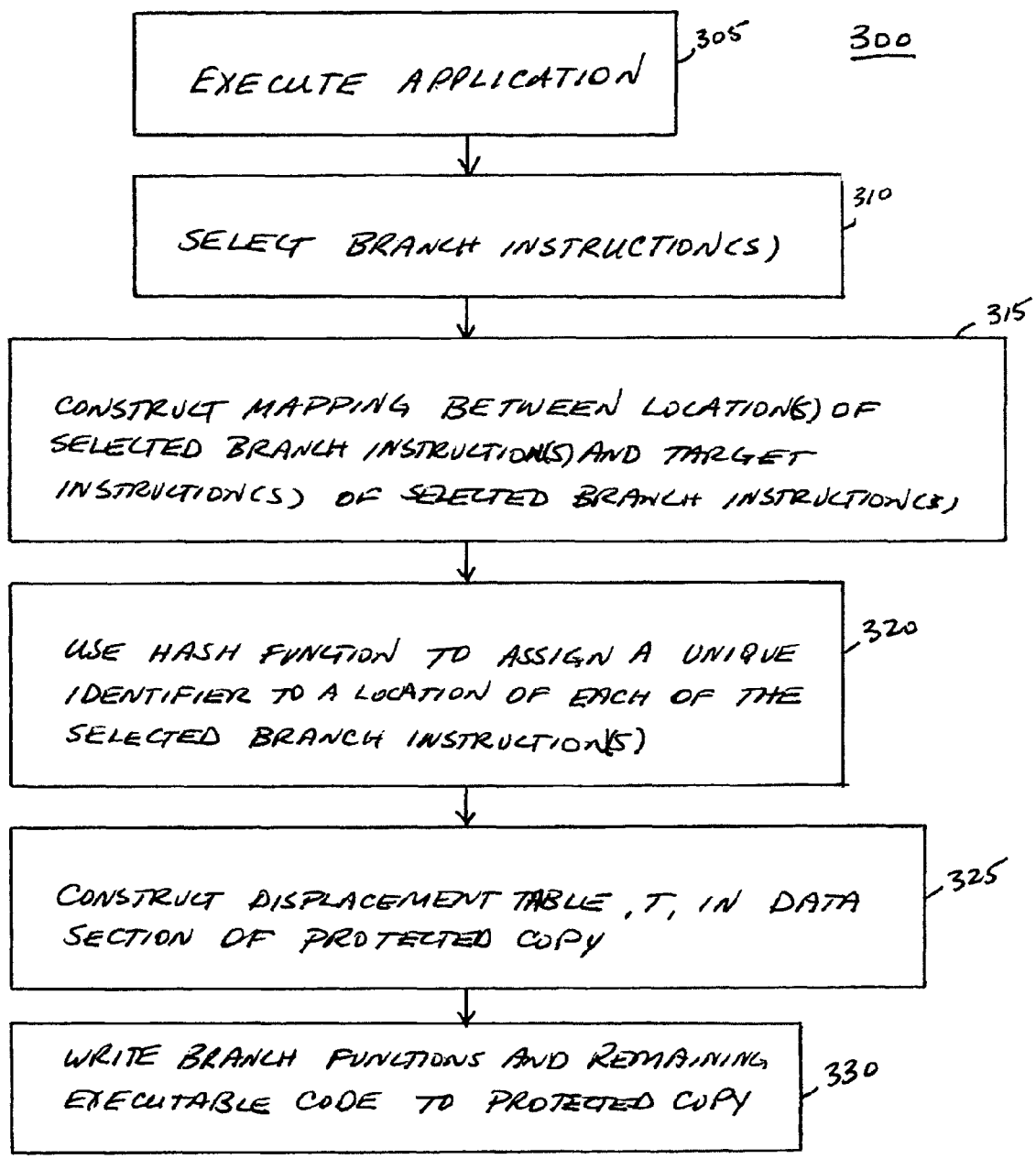
FIG. 3 is a process flow chart illustrating a method of operation of the piracy protection system of FIGS. 1 and 2 in generating a protected copy of an application.

In general, the branch function 215 is responsible for choosing the correct target instruction based on the call location. There are a variety of ways to accomplish such a task. FIG. 3 illustrates a method 300 of system 10 in generating the branch functions 215 and the table 230. System 10 executes application 25 (step 305). During execution of application 25, system 10 selects one or more branch instructions in application 25 (step 310) and constructs a mapping between locations of the branch instructions ($j_n$) and the target instructions ($t_n$) of the selected branch instructions (step 315):

$$\theta = \{j_1 \rightarrow t_1, j_2 \rightarrow t_2, \ldots, j_n \rightarrow t_n\}$$

System 10 uses a hash function to assign a unique identifier to locations of each of the selected branch instructions (step 320):

$$h = \{j_1, j_2, \ldots, j_n\} \rightarrow \{1, 2, \ldots, n\}$$

System 10 constructs a displacement table, T, 230 in a data section of the protected copy 25 that lists displacements for each ($j_i, t_i$) pair (step 325); the displacement is the difference in location in the code of application 25 from a selected branch instruction to the target instruction of the selected branch instruction. The displacements are stored in the displacement table, T, 230 such that $T[h(j_i)] = t_i - j_i$. System 10 writes the branch functions with the executable code of application 25 to the protected copy 45 (step 330).

The use of the branch function provides tamper detection. Any transformation applied to a branch function 215 that alters the displacement between the branch instruction and the target instruction causes the branch function 215 to return to an incorrect target instruction. Through the use of the branch function 215, obvious control flow is removed from the protected copy 45.

Figure 4A:
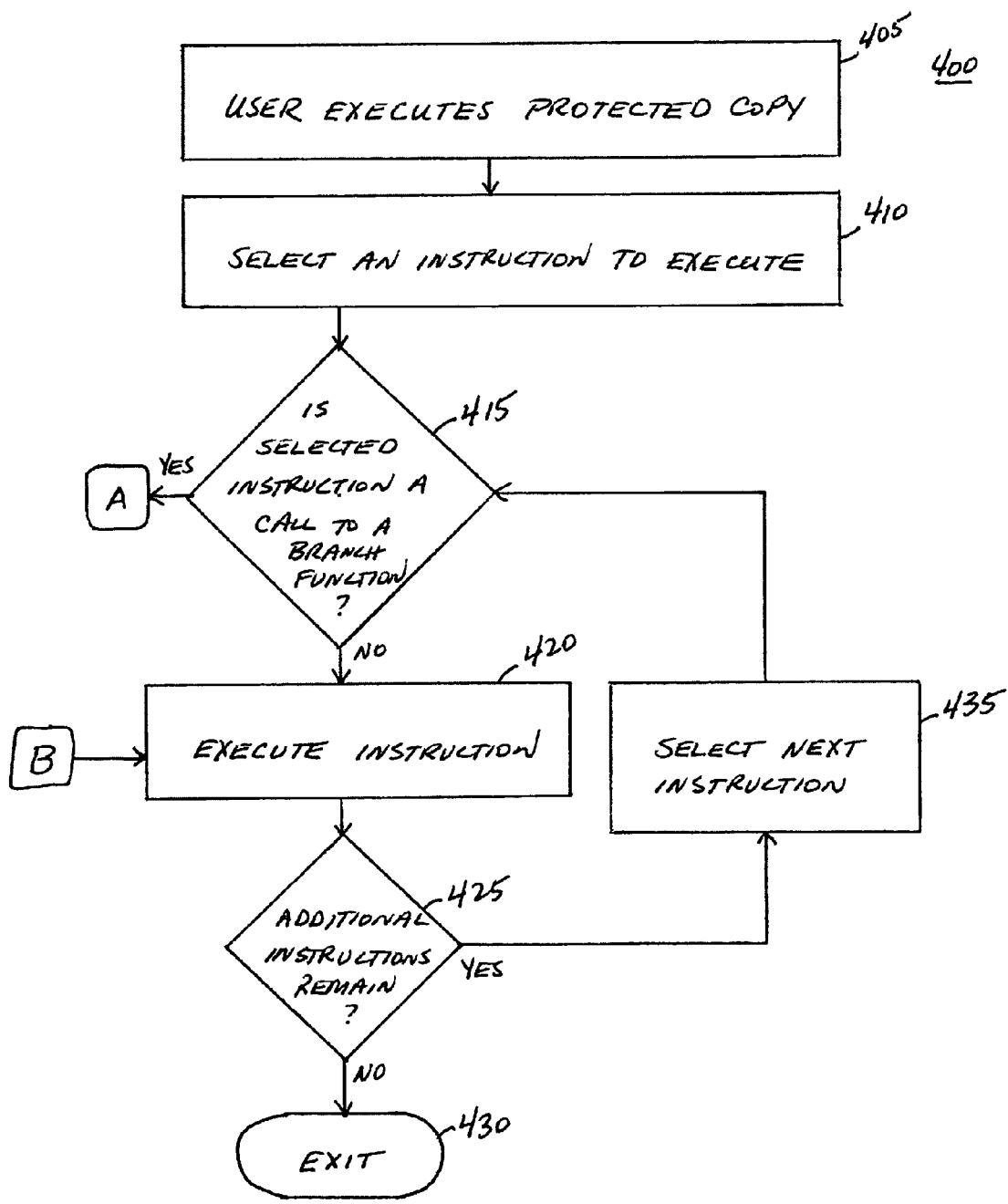
FIG. 4 is comprised of FIGS. 4A and 4B, and represents a process flow chart illustrating a method of operation of the protected copy comprising branch instructions generated by the piracy protection system of FIGS. 1 and 2.
Figure 4B:
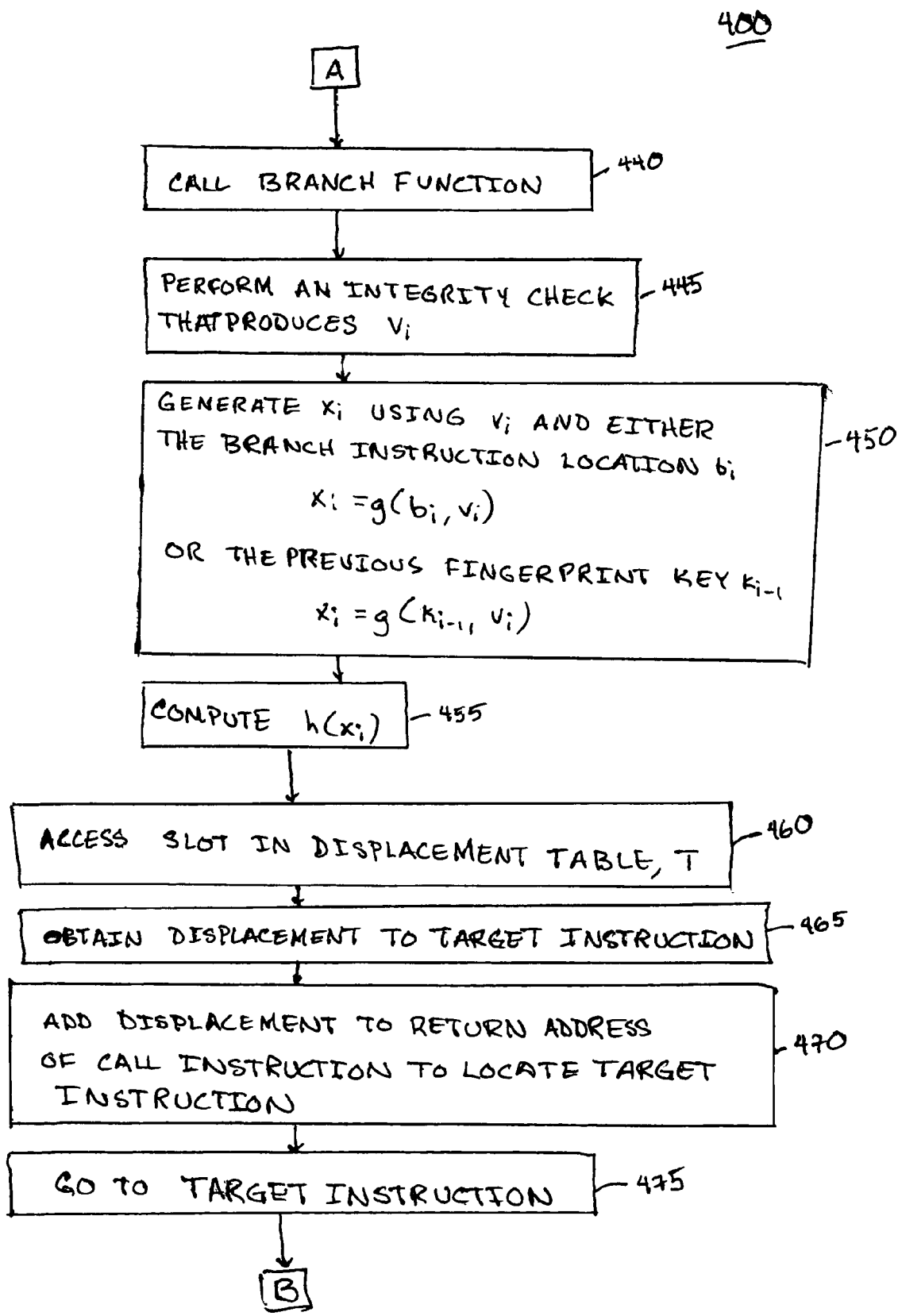

FIG. 4 (FIGS. 4A, 4B) illustrates a method 400 of operation of the protected copy 45. A user executes the protected copy 45 (step 405). The protected copy 45 selects an instruction to execute (step 410). If the selected instruction is a not call to a branch function 215 (decision step 415), the protected copy 45 executes the instruction (step 420). While the method 400 is illustrated using a call instruction, any branch instruction may be used that transfers execution control to one of the branch functions 215. If no additional instructions remain in the protected copy 45 for execution (decision step 425), the protected copy 45 exits execution (step 430). If additional instructions remain (decision step 425), the protected copy 45 selects a next instruction (step 435) and returns to decision step 415.

If the selected instruction is a call to a branch function 215 (decision step 415), the protected copy 45 calls the branch function 215 (step 440, FIG. 4B). An integrity check is performed to generate a value $v_i$ (step 445). A value $x_i$ is produced using $v_i$ and either the previous key, $k_{i-1}$, or the branch location $b_i$ (step 450). The called branch function 215 applies a hash function to the value generated $x_i$ to compute $h(x_i)$ (step 455). The term $h(x_i)$ corresponds to a slot in the displacement table, T, 230. The branch function 215 accesses the slot $h(x_i)$ in the displacement table, T, 230 (step 460) and obtains the displacement to a target instruction (step 465). The branch function 215 adds the displacement to the return address of the call instruction (corresponding to the original branch instruction replaced by the call instruction) (step 470).

The protected copy 45 goes to the target instruction (step 475) and executes the instruction (step 420). If no additional instructions remain in the protected copy 45 for execution (decision step 425), the protected copy 45 exits execution (step 430). If additional instructions remain (decision step 425), the protected copy 45 selects a next instruction (step 435) and returns to decision step 415.

Figure 5:
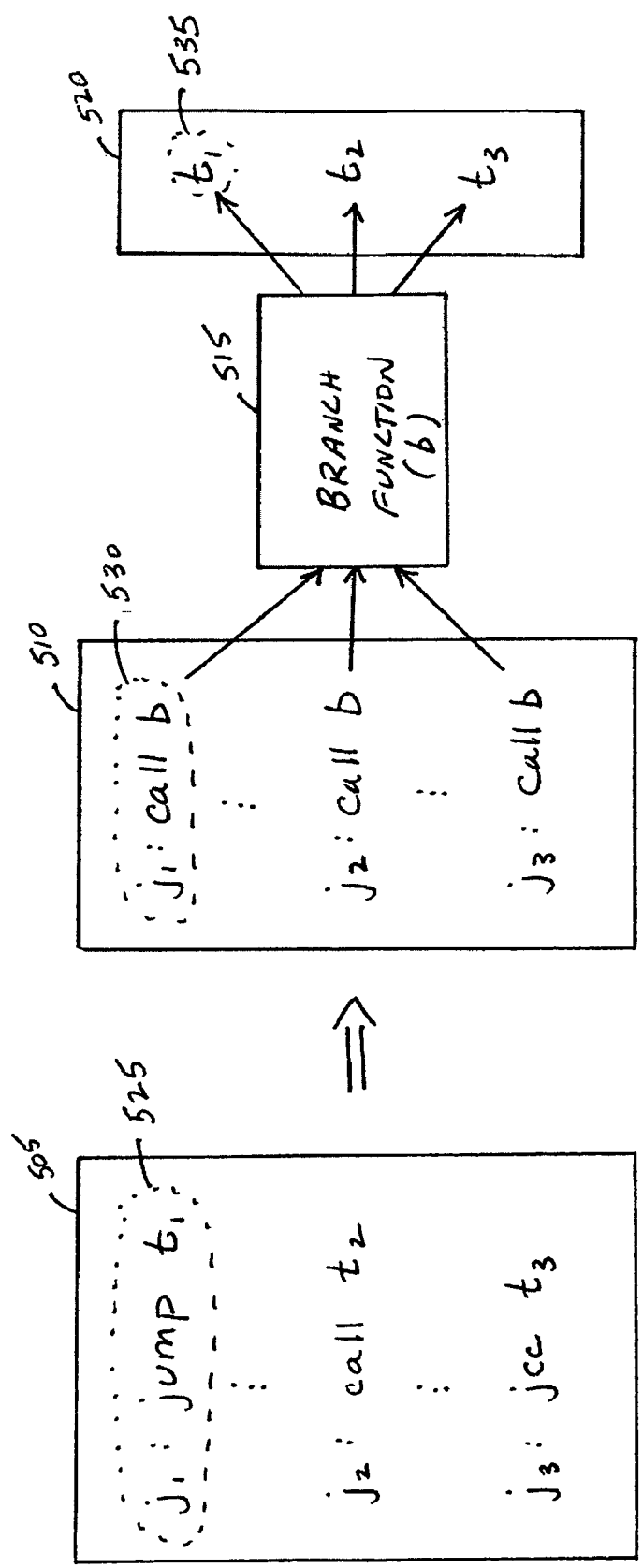
FIG. 5 is a diagram illustrating transformation of a branch instruction to a call to a branch function by the piracy protection system of FIGS. 1 and 2.

FIG. 5 illustrates conversion of a branch instruction to the branch function 215 using, as an example, an exemplary application in the x86 instruction set. In this example, instructions 505 such as, for example, jmp, call, and jcc instructions, are converted to call instructions 510. Each of the call instructions 510 calls a single branch function 515. The branch function 515 directs control flow to target locations 520. FIG. 5 demonstrates how a control flow is interpreted in an application after transformation by system 10. For example, an instruction 525 in the exemplary application before transformation is:

$j_1$: jump $t_1$

System 10 replaces instruction 525 with call instruction 530:

$j_1$: call b where the instruction "call b" references a call to the branch function 515. The branch function 515 returns execution control to the target instruction at target location $t_1$ 535.

To provide further tamper detection for the protected copy 45, the integrity check processor 205 transforms one or more branch instructions into branch functions that incorporate an integrity check, referenced herein as integrity check branch functions 235. One or more integrity check branch functions 235 are incorporated in the protected copy 45 by system 10 to develop a self-monitoring check system for the protected copy 45.

Figure 6:
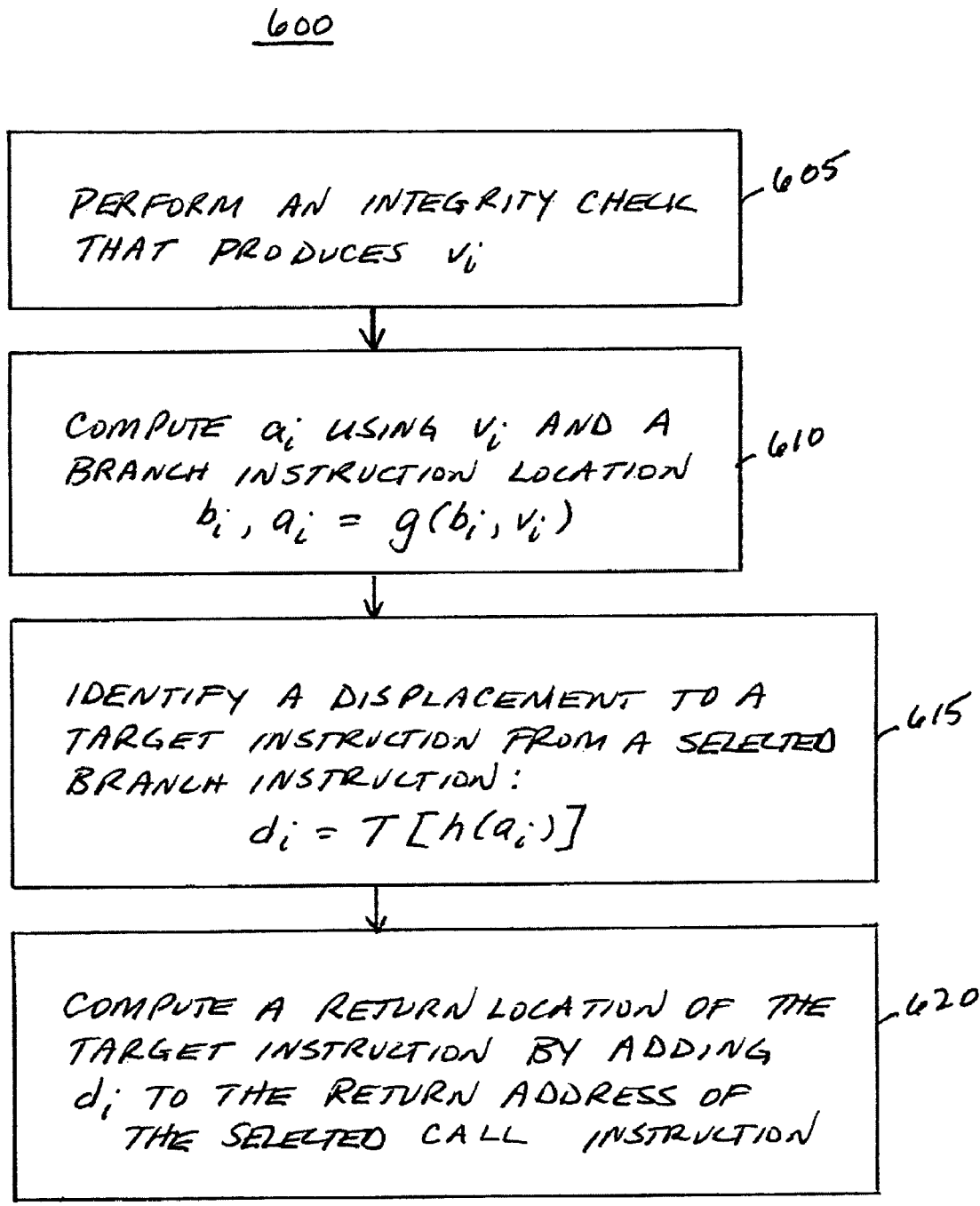
FIG. 6 is a process flow diagram illustrating a method of operation of an integrity check module of the piracy protection system of FIGS. 1 and 2.

The integrity check processor 205 inserts the integrity check module 220 in the protected copy 45. The integrity check module 220 incorporates an integrity check into the computation of the location of a target instruction at step 455, method 400, FIG. 4. FIG. 6 illustrates a method 600 of operation of the integrity check module 220. The integrity check module 220 performs an integrity check that produces a value $v_i$ (step 605). The integrity check module 220 computes a value $a_i$ using $v_i$ and a branch instruction location $b_i$, $a_i = g(b_i, v_i)$ (step 610). The integrity check module 220 identifies a displacement to a target instruction from a selected branch instruction via $d_i = T[h(a_i)]$ where the displacement table, T, 230 is stored in the data section of the protected copy 45 and h is a hash function (step 615). The integrity check module 220 computes a return location of the target instruction by adding the displacement $d_i$ to the return address of the selected call instruction (step 620).

Through the incorporation of an integrity check in the integrity check branch function 235, system 10 provides tamper detection for the entire program of the protected copy 45 as opposed to only those instructions between a branch instruction and a target instruction. The integrity check module 220 is an inserted section of code used to verify the integrity of the protected copy 45. Any of a variety of techniques can be used by system 10 to perform an integrity check such as, for example, a checksum over a block of code. Through the use of integrity checks, the protected copy 45 can identify, for example, whether it has been subjected to semantics-preserving transformations or whether a debugger is present during execution.

Figure 7A:
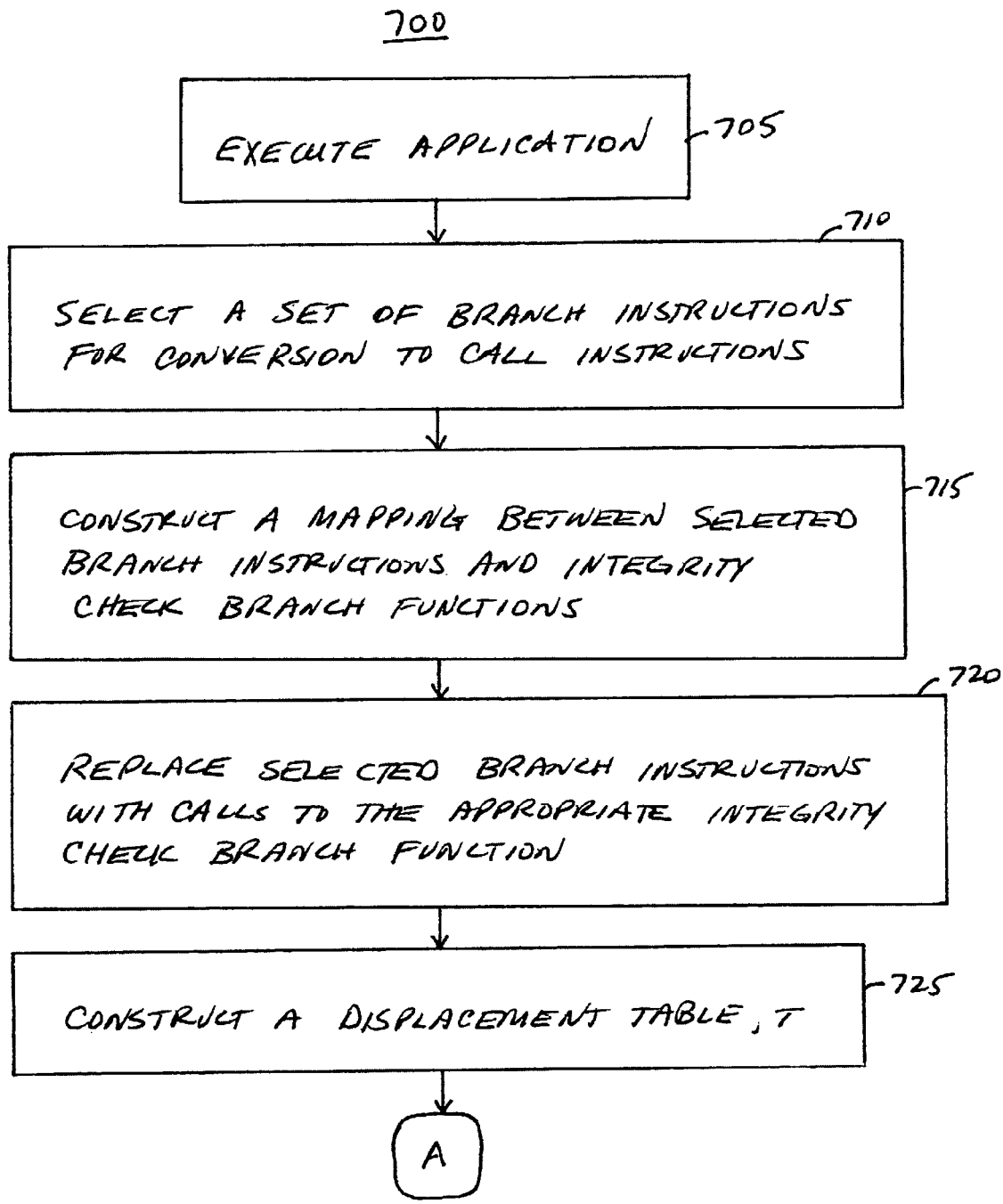
FIG. 7 is comprised of FIGS. 7A and 7B and represents a process flow diagram of the piracy protection system of FIGS. 1 and 2 in inserting an integrity check module in a protected copy of an application.
Figure 7B:
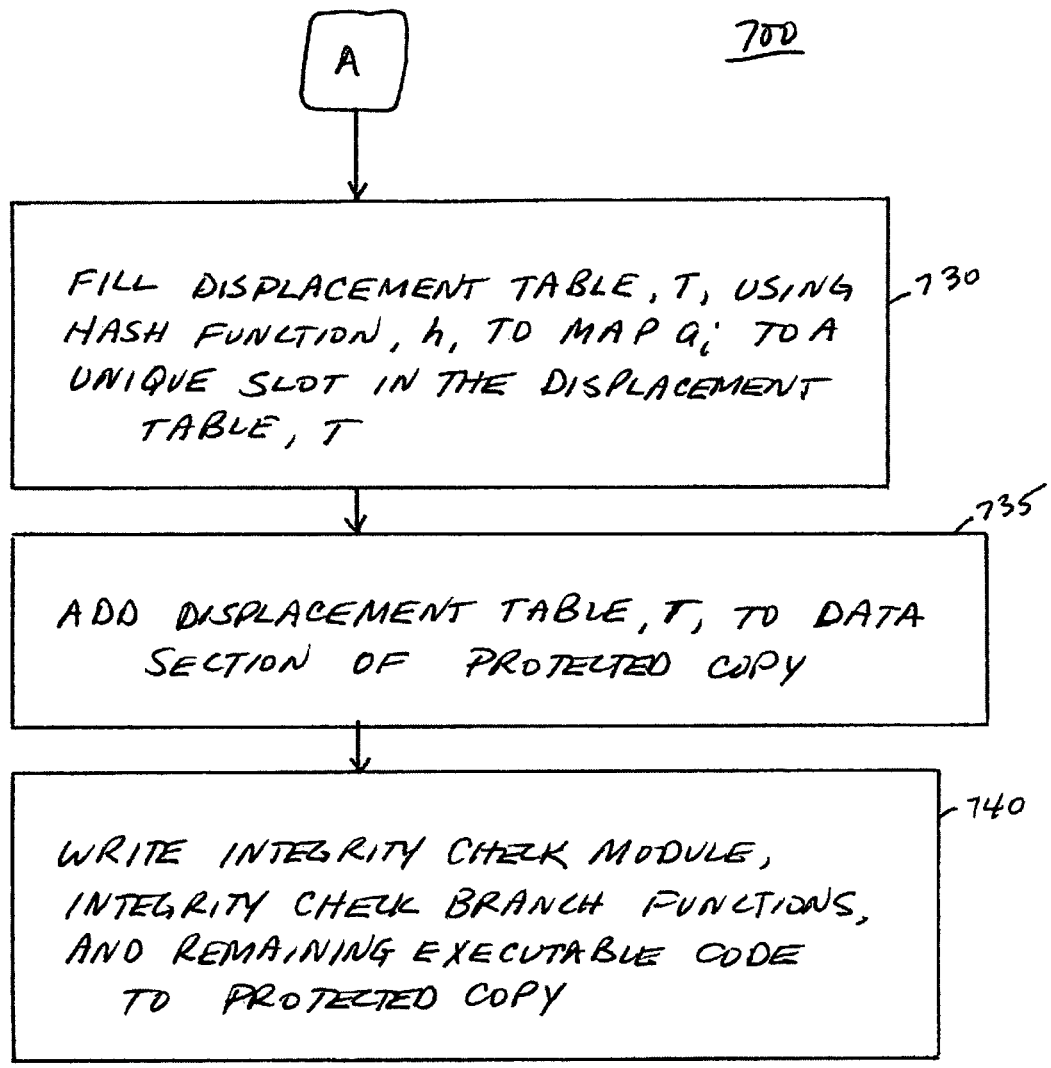

FIG. 7 (FIGS. 7A, 7B) illustrates a method 700 in which a tamper detection mechanism is incorporated into the protected copy 45 by injecting an integrity check module 220 into the protected copy 45 and converting selected branch instructions to calls to the integrity check branch functions 235. System 10 executes application 25 (step 705). The integrity check processor 205 selects a set of branch instructions, $\{b_1, \ldots, b_n\}$, for conversion into call instructions (step 710).

The number and location of the selected branch instructions is based on a trade off between robustness and performance overhead. The robustness against reverse engineering is partially based on the number of converted branch instructions. However, as the number of converted branch instructions increases so does the overhead of repeated execution of the integrity check branch functions 235. A criterion used for selecting branch instructions in performance sensitive application is to avoid program hotspots (sections of code that are repeatedly executed). Otherwise, branch instructions can be selected in a random fashion. System 10 can select any, some, or all of the branch instructions for transformation to call functions that call the integrity check branch functions 235.

The integrity check processor 205 constructs a mapping between the selected branch instructions and the integrity check branch functions 235 (step 715):

$$\theta = \{b_1, \ldots, b_n\} \rightarrow \{IntegrityCheck_1, \ldots, IntegrityCheck_n\},$$

where the term IntegrityCheck refers to an integrity check branch function 235. The integrity check processor 205 uses this mapping to replace the selected branch instructions by calls to the appropriate integrity check branch functions 235 (step 720).

The integrity check processor 205 constructs a displacement table, T, 230 (step 725). For each of the selected branch instructions replaced in application 25, a mapping is maintained between the calculated value $a_i$ and the displacement $d_i$ between the selected branch instruction and its related target instruction displacement. This mapping is described as:

$$\phi = \{a_1 \rightarrow d_1, \ldots, a_n \rightarrow d_n\}$$

The integrity check processor 205 uses $\phi$ to construct the displacement table, T, 230 in step 725. To fill the displacement table, T, 230, the integrity check processor 205 constructs a hash function, h, such that each value $a_i$ maps to a unique slot in the displacement table, T, 230 (step 730):

$$h: \{a_1, \ldots, a_n\} \rightarrow \{1, \ldots, m\}, n \leq m$$

where $\{1, \ldots, m\}$ are the slots in the displacement table, T, 230 to which the values $\{a_1, \ldots, a_n\}$ are mapped. By using a perfect hash function, the size of the displacement table, T, 230 can be minimized. Based on h, the displacement table, T, 230 is added to the data section of the protected copy 45 (step 735):

$$T[h(a_i)] = d_i$$

System 10 writes the integrity check module 220, the integrity check branch functions 230, and remaining executable code from application 25 to the protected copy 45 (step 740).

FIG. 8 illustrates an exemplary code transformation from original code 805 to protected code 810 incorporating the integrity check module 220. Branch instruction jmp 1.2, 815, is transformed to call_branch_function_1 820. Branch instruction jge L3, 825, is transformed to call_branch_function_2 830. Branch instruction call printf 835 is transformed to call_branch_function_3 840. Branch instruction jmp L1, 845, is transformed to call_branch_function_1 850.

Figure 9:
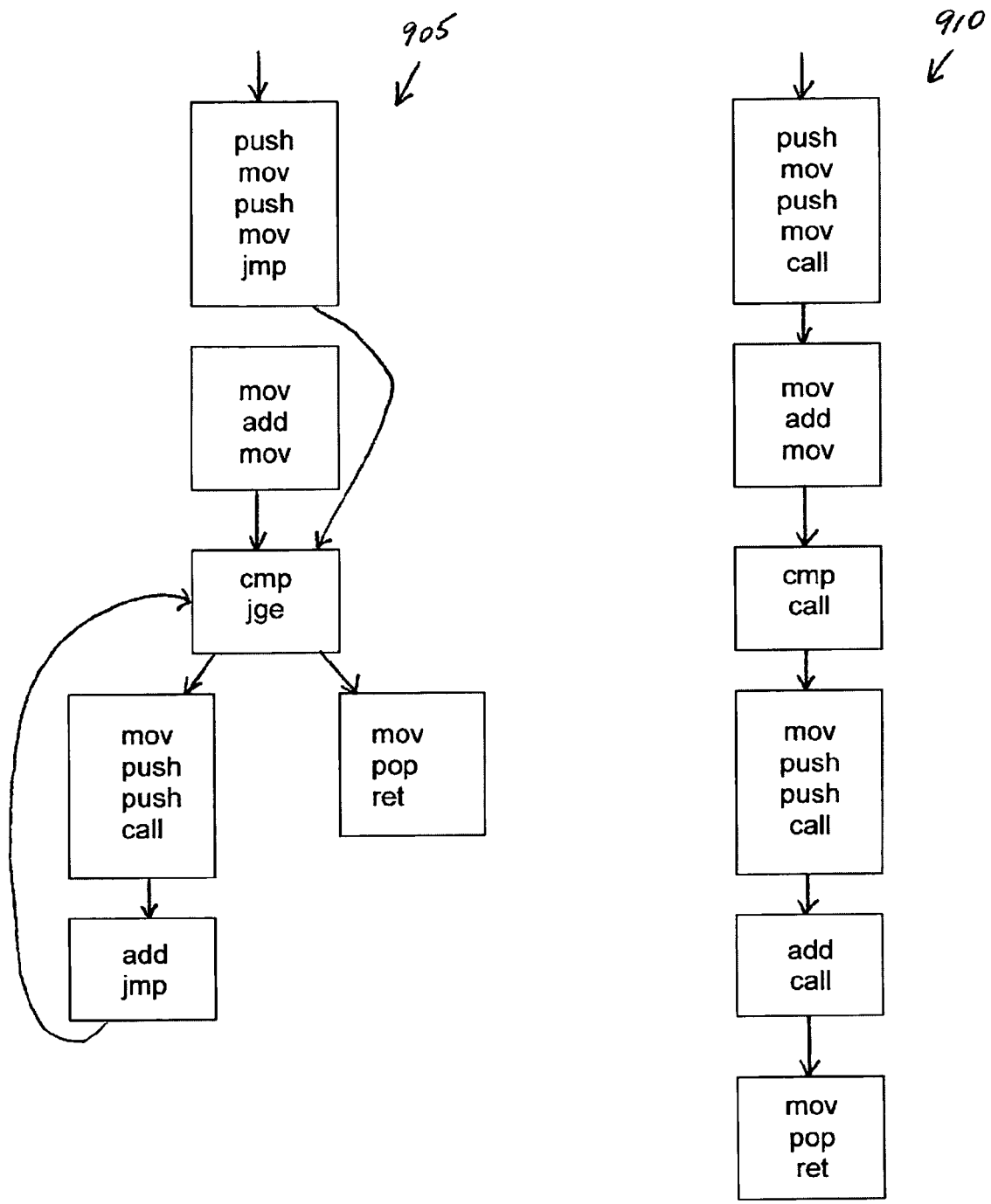
FIG. 9 is a diagram illustrating an exemplary control flow for the original code of FIG. 8 and an exemplary protected control flow graph for the protected code of FIG. 8 as generated by the piracy protection system of FIGS. 1 and 2.

FIG. 9 illustrates an exemplary control flow graph 905 representing the original code 805 and a protected control flow graph 910 representing protected code 810. The original control flow graph 905 and the protected control flow graph 910 demonstrate how control flow is interpreted before and after the transformation of application 25 to the protected copy 45 by the integrity check processor 205.

In one embodiment, system 10 further enhances the tamper-detection strength of protected copy 45 through the use of indirection. Added levels of indirection increase the amount of analysis required by an attacker to understand the protected copy 45. Further indirection can be incorporated by rerouting all calls to the integrity check branch functions 235 through a single super branch function that transfers execution to the proper branch function 215.

A goal of any tamper detection technique is to prevent an adversary from altering or reverse engineering the program. One of the most common forms of automated attack is code obfuscation. Through the use of the integrity check modules 220, the protected copy 45 is able to self-detect semantics-preserving transformations. A variety of transformations were applied to an exemplary protected copy 45 to verify that protected copy 45 behaved as expected. In each case, the protected copy 45 failed to function correctly after the obfuscation had been applied, as desired.

A common manual attack is to inspect the code of an application to locate and remove a license check. Successful removal of the license check in the protected copy 45 requires an attacker to "unravel" the displacement table, T, 230, and replace all of the calls with the correct branch instruction and displacement; otherwise the alteration is detected by the protected copy 45. This attack requires extensive dynamic analysis that in many cases is prevented by the integrity check modules 220 installed in the protected copy 45 by system 10. For example, the use of a debugger can be self-detected by the protected copy 45, leading to incorrect program behavior or failure, as desired.

System 10 further inhibits the ability of an adversary to reverse engineer the protected copy 45. By replacing conditional and unconditional jumps, the obvious control flow of the protected copy 45 has been removed. Advantageously, the protected copy 45 detects an attack based on information available only at runtime, eliminating the use of static analysis tools. To completely reverse engineer the program, an attacker has to dynamically analyze the protected copy 45. The integrity check module 220 installed in the protected copy 45 by system 10 significantly inhibits dynamic analysis.

System 10 improves the level of protection of the protected copy 45 by intertwining tamper detection with software watermarking such as author marking and fingerprinting performed by the watermarking module 225. System 10 provides another protection mechanism for the protected copy 45 and protects the watermark from being damaged or removed.

Fingerprinting can be accomplished through the use of a key generating branch function, the fingerprint branch function 240. The watermark processor 210 embeds the fingerprint mark, FM, 245 in the protected copy 45 by selecting a specific set of functions that call the fingerprint branch function 240. The fingerprint mark, FM, 245 is a composition of one or more final keys produced for each of the selected functions.

Each time the fingerprint branch function 240 executes in the protected copy 45, the fingerprint key 250 is evolved in a key generation cycle. The generation of the fingerprint key 250 is based on a one-way function that takes as input the integrity check value, $v_i$, and a previous fingerprint key 250, $k_{i-1}$:

$$k_i = g(k_{i-1}, v_i).$$

The newly generated fingerprint key 250, $k_i$, is used in the displacement look-up. The displacement is found in slot $h(k_i)$ in the displacement table, T, 230.

The displacement is mapped to a specific fingerprint key 250 in the key generation cycle. Consequently, system 10 uses a subset of the branch instructions in application 25 that are on a deterministic path; i.e. the branch instructions are executed each time the protected copy 45 executes. If a branch instruction is not executed each time the protected copy 45 executes, the fingerprint key 250 does not evolve correctly. Therefore, the branch instructions used for computation of the fingerprint key 250 in the watermarking module 225 are required to reside on a deterministic path through the protected copy 45.

Figure 10:
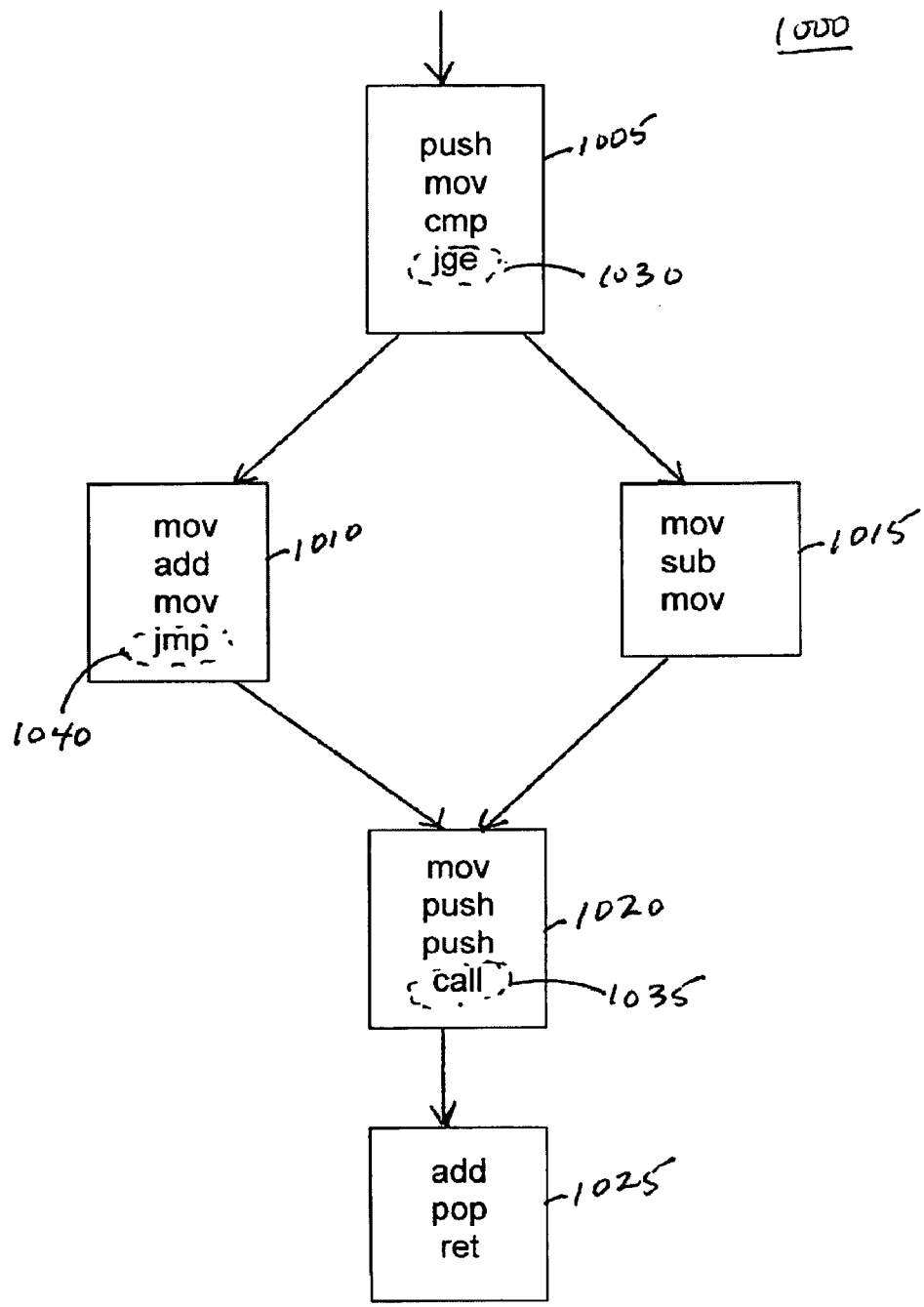
FIG. 10 is an exemplary control flow graph illustrating deterministic and non-deterministic branch paths, wherein deterministic branch paths are used by the piracy protection system of FIGS. 1 and 2 to generate a fingerprint mark in the protected copy.

FIG. 10 is an exemplary control flow graph of a function 1000 illustrating deterministic and non-deterministic branch instructions. The control flow graph is comprised of instructions in a block 1005, a block 1010, a block 1015, a block 1020, and a block 1025. The control flow to block 1010 and block 1015 from block 1005 represents a "conditional" branch instruction where either block 1010 or block 1015 is executed. A branch instruction jge 1030 in block 1005 and a call instruction 1035 in block 1020 are deterministic branch instructions and can be used by the watermarking processor 210 for fingerprinting the protected copy 45. However, the watermarking processor 210 cannot use a branch instruction jmp 1040 in block 1010; the branch instruction jmp 1050 is part of the else branch instruction and is not guaranteed execution every time the function 1000 is executed. Furthermore, branch instructions selected for use by the watermarking processor 210 cannot be part of a non-deterministic loop because a new fingerprint key 250 is generated in the protected copy 45 each time one of the fingerprint branch functions 240 is executed.

A set of deterministic branch instructions useable by system 10 to generate a fingerprint is identified through data-flow analysis of the application 25. Each of the selected deterministic branch instructions is replaced with a call to one of the fingerprint branch functions 240. When the protected copy 45 comprises both an integrity check module 220 and a watermarking module 225, system 10 uses for the integrity check modules 220 those non-deterministic branch instructions not used to generate the fingerprint key 250 for the watermarking module 225.

The watermarking processor 210 comprises an embed function and a recognize function. The embed function for system 10 can be described with the following inputs and outputs:

$$\text{embed}(P, AM, key_{AM}, key_{FM}) \rightarrow P', FM,$$

where P is an input program, application 25, AM is the authorship mark 255, $key_{AM}$, is the secret authorship key 260 for the authorship mark 255, FM is the fingerprint mark 245, $key_{FM}$, is a secret fingerprint key 250 for the fingerprint mark 245, and P' is an output program, the protected copy 45.

System 10 concurrently embeds the authorship mark, AM, 255 and the fingerprint mark, FM, 245. Consequently, two secret keys are required: the authorship key 260, $key_{AM}$, and the fingerprint key 250, $key_{FM}$. In contrast, a conventional fingerprinting system uses a single key. The authorship key 260, $key_{AM}$, is tied to the authorship mark, AM, 255 and is the same for every copy of the protected copy 45. The fingerprint key 250, $key_{FM}$, is required for the fingerprint mark, FM, 245 and is unique for each copy of the protected copy 45. An initial key value for the fingerprint key 250, $key_{FM}$, is optionally assigned to the protected copy 45 as part of the process of registering the protected copy 45. The fingerprint mark, FM, 245 for a particular instance of the protected copy 45 is based on the fingerprint key 250, $key_{FM}$, and execution of the protected copy 45. The fingerprint mark 245, FM, is generated during embedding and is an output of the embed function.

The recognize function for watermarking processor 210 can be described with the following inputs and outputs:

$$\text{recognize}(P', key_{AM}, key_{FM}) \rightarrow AM, FM$$

The recognition technique of the watermarking processor 210 is blind; i.e., the authorship mark, AM, 255 and the fingerprint mark, FM, 245 are obtained from the protected copy 45 by providing the secret keys: the authorship key 260, $key_{AM}$, and the fingerprint key 250, $key_{FM}$.

The watermarking module 225 of system 10 is dynamic; i.e., the authorship key 260, $key_{AM}$, is an input to the protected copy 45. By executing the protected copy 45 with the secret input of the authorship key 260, $key_{AM}$, a trace comprising of a set of deterministic branch instructions is identified. The set of deterministic branch instructions comprises those functions that participate in a calculation of the fingerprint mark, FM, 245. The authorship key 260, $key_{AM}$, serves to provide a stronger argument for the validity of both the authorship mark, AM, 255 and the fingerprint mark, FM, 245. Further, the authorship key 260, $key_{AM}$, makes recognition more reliable. When the protected copy 45 is executed with the authorship key 260, $key_{AM}$, (i.e., the secret input), the owner of the application 25 knows that the fingerprint mark, FM, 245, is produced and knows where to locate the fingerprint mark, FM, 245.

The watermarking module 225 generates the fingerprint mark, FM, 245 as the protected copy 45 executes through the use of the fingerprint branch function 240 and the fingerprint key 250, $key_{FM}$. The original branch instruction in the application 25 simply transferred execution control to the branch instruction target. In addition to the transfer of execution control, the fingerprint branch function 240 is responsible for evolving the fingerprint key 250, $key_{FM}$.

Figure 11:
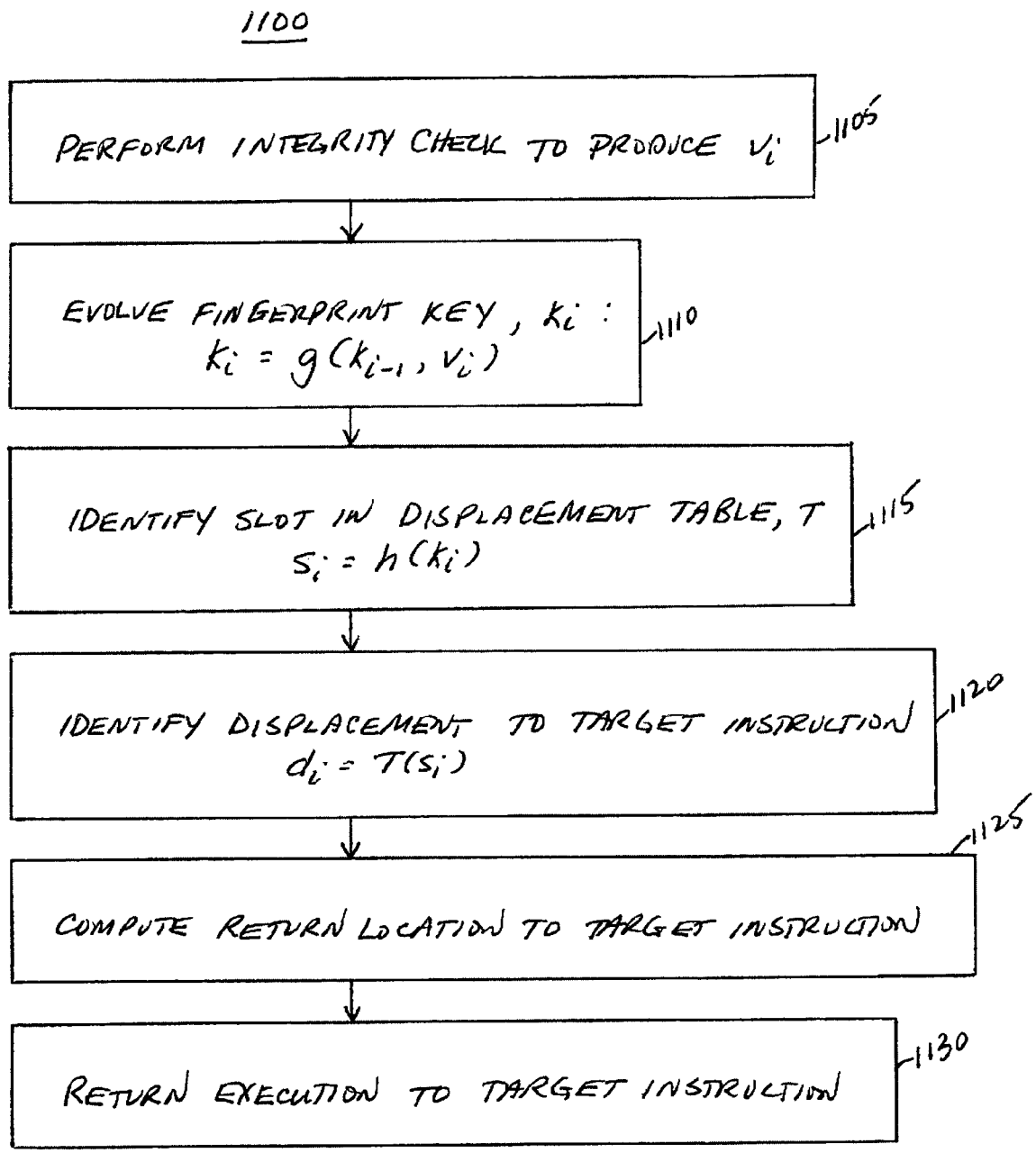
FIG. 11 is a process flow chart illustrating a method of a fingerprint function of the piracy protection system of FIGS. 1 and 2 in evolving a fingerprint key.

FIG. 11 illustrates a method 1100 of the fingerprint branch function 240 in evolving the fingerprint key 250, $key_{FM}$. Each time the fingerprint branch function 240 is called, a new fingerprint key 250, $k_i$, is produced and the return location of the target instruction is identified with the aid of the fingerprint key 250, $k_i$. The fingerprint branch function 240 performs an integrity check that produces a value, $v_i$ (step 1105). The fingerprint branch function 240 evolves the next fingerprint key 250, $k_i$, (step 1110) through the use of a one-way function, $$k_i = g(k_{i-1}, v_i).$$

The fingerprint branch function 240 identifies a slot, $s_i$, in the displacement table, T, 230 where the displacement to the target instruction is located (step 1115):

$$s_i = h(k_i)$$

The fingerprint branch function 240 identifies a displacement to the next instruction via $d_i = T[s_i]$ (step 1120), where the displacement table, T, 230 is stored in the data section of the protected copy 45 and h is a perfect hashing function. The fingerprint branch function 240 computes the return location of the target instruction by adding the displacement, $d_i$, to the return address of the call instruction that called the fingerprint branch function (step 1125). Execution control is returned to the target instruction at the computed return location (step 1130).

A variation in the fingerprint mark, FM, 245 is obtained through the fingerprint key 255, $key_{FM}$, that is unique for each copy of the protected copy 45. System 10 uses an initial key in the generation of the fingerprint key 255, $key_{FM}$. System 10 obtains each function in the set of functions comprising a deterministic branch instruction by executing the protected copy 45 with the secret input, producing a function key. Each of these function keys is combined in a commutative way (e.g., by adding the values) to produce the fingerprint mark, FM, 245 for the protected copy 45.

Within the fingerprint branch function 240, the authorship mark, AM, 255 and tamper detection can be incorporated. An ideal authorship mark possesses some mathematical property that allows for a strong argument that it was intentionally placed in the program and that its discovery is not accidental. An example of such a mathematical property is AM=p·q where p and q are very large primes. Factoring the authorship mark, AM, 255 into p and q is a difficult problem; only the person who embedded such a watermark is able to identify the factors p and q. To encode the authorship mark, AM, 255 in the fingerprint branch function 240, system 10 uses a one-way function such that one of the variables in the authorship mark, AM, 255. An exemplary one-way function is:

$$k_i = MD5[(k_{i-1} \oplus AM) \| v_i]$$

As used herein, the term MD5 refers to a specific cryptographic hash function that can be used in conjunction with the present invention.

System 10 provides tamper detection with the branch function 215. The displacement table, T, 230 stores a displacement, therefore any transformation applied to the branch function 215 that alters the displacement between a branch instruction and the target instruction of the branch instruction causes the branch function 215 to return to an incorrect instruction. When utilizing the fingerprint branch function 240, system 10 incorporates an integrity check that provides tamper detection throughout the protected copy 45. An integrity check is a section of code inserted in the protected copy 45 to verify the integrity of the protected copy 45. One such example of an integrity check is a checksum over a block of code.

The integrity check identifies whether the protected copy 45 has been subjected to semantics-preserving transformations or whether a debugger is present during execution of the protected copy 45. The integrity check produces some value $v_i$ that is used as an additional input to the one-way function responsible for the generation of the fingerprint key 250. By basing the generation of the fingerprint key 250 on $k_{i-1}$ and $v_i$, system 10 is able to cause failure of the protected copy 45 if either the fingerprint key 250 or the code of the protected copy 45 has been altered.

Figure 12:
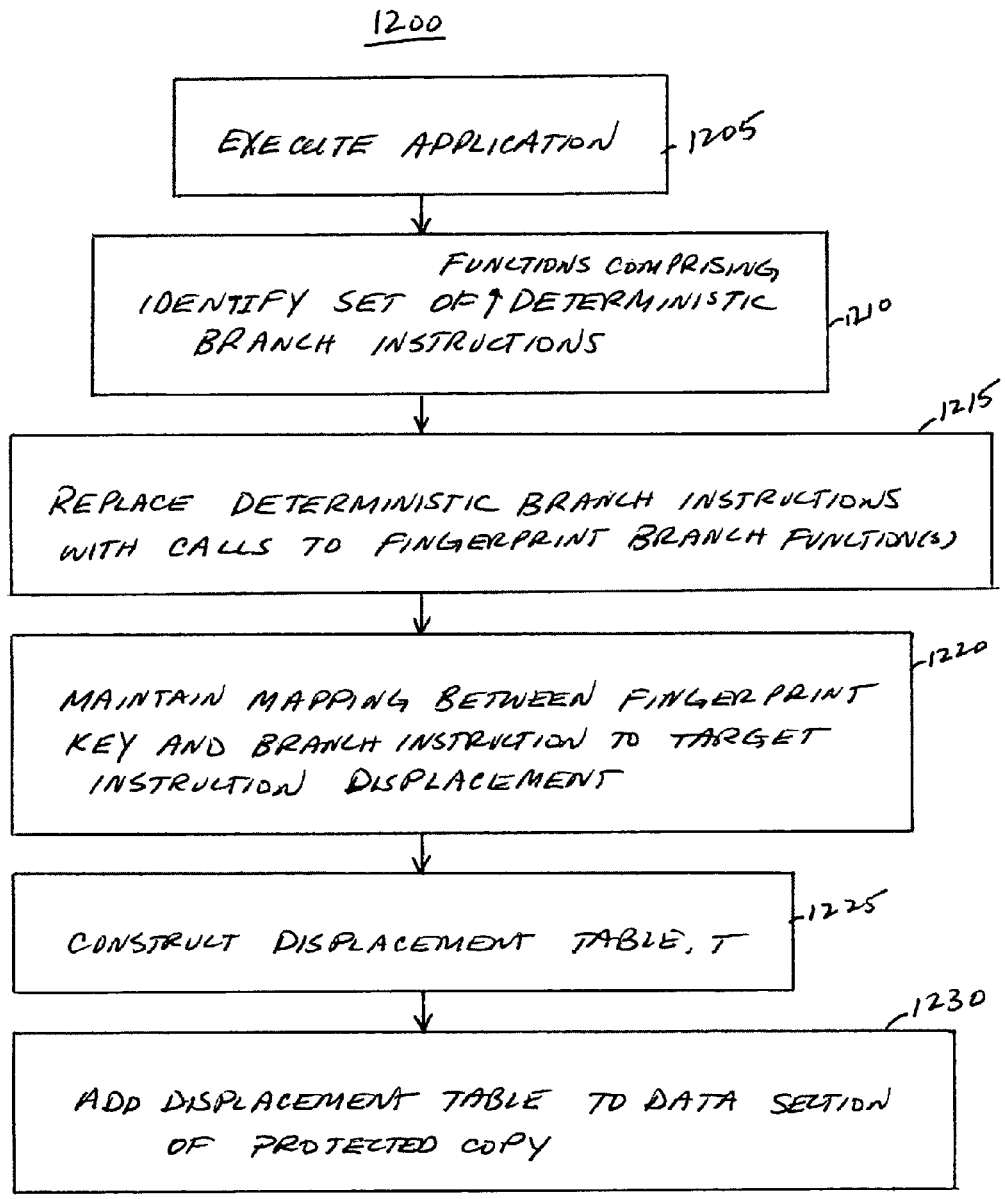
FIG. 12 is a process flow chart illustrating a method of the piracy protection system of FIGS. 1 and 2 in embedding an authorship mark or a fingerprint mark in a protected copy of an application.

System 10 embeds the fingerprint mark, FM, and the authorship mark, AM, by injecting the fingerprint branch function into the application 25. System 10 further imbeds the fingerprint mark, FM, 245 and the authorship mark, AM, 255 by converting branch instructions to calls to the fingerprint branch function 240. FIG. 12 illustrates a method 1200 of the embedding process of the watermarking processor 210. The watermarking processor 210 executes application 25 using the secret input to obtain a trace of application 25 (step 1205).

The trace identifies a set of functions comprising deterministic branch instructions through which execution passes (step 1210); the selected deterministic branch instructions reside on a path through a function that is traversed each time the function is executed. To identify the deterministic path through the function in the application 25, the watermarking processor 210 computes a dominator set for the exit block in a function control flow graph. The dominator set may comprise blocks that are part of a non-deterministic loop, such as the loop header. Any such block is removed from the path.

The watermarking processor 210 replaces the each of the selected deterministic branch instructions with calls to the fingerprint branch function 240 (step 1215). For each branch instruction replaced by the watermarking processor 210, the watermarking module 225 maintains a mapping between a calculated key and the displacement to the target instruction (step 1220):

$$\theta = \{k_1 \to d_1, k_2 \to d_2, \ldots, k_n \to d_n\}$$

The watermarking processor 210 uses θ to construct the displacement table, T, 230 (step 1225). The watermarking processor 210 constructs the perfect hash function such that each fingerprint key 255 maps to a unique slot in the displacement table, T, 230, and the size of the displacement table, T, 230 is minimized:

$$h = \{k_1, k_2, \ldots, k_n\} \to \{1, 2, \ldots, n\}$$

The watermarking processor 210 adds the displacement table, T, 230 to the data section of the protected copy 45 (step 1230):

$$T[h(k_i)] = d_i$$

Figure 13:
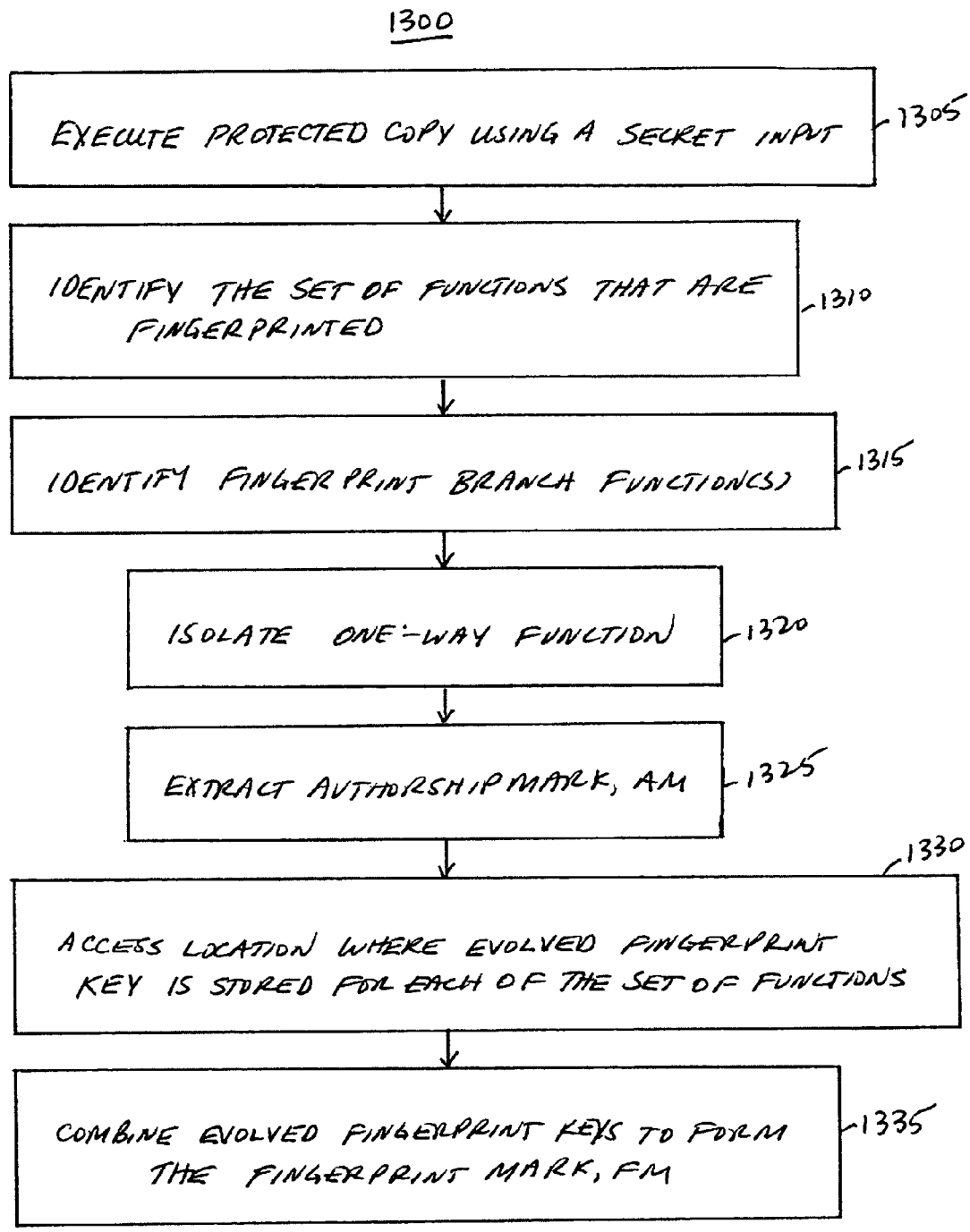
FIG. 13 is a process flow chart illustrating a method of operation of the piracy protection system of FIGS. 1 and 2 in recognizing an authorship mark or a fingerprint mark embedded in a protected copy of an application.

FIG. 13 illustrates a method 1300 of operation in recognizing an embedded authorship mark, AM, 255 or an embedded fingerprint mark, FM 245. System 10 executes the protected copy 45 using the secret input (step 1305). Executing the protected copy 45 identifies a set of functions comprising deterministic branch instructions that have been fingerprinted (step 1310). Executing the protected copy 45 further identifies the fingerprint branch function(s) 240 (step 1315). Once the fingerprint branch function 240 has been identified, system 10 isolates the one-way function (step 1320) to extract the authorship mark, AM, 255 (step 1325). To extract the fingerprint mark, FM, 245, system 10 accesses the location where the evolved fingerprint key 250 is stored for each of the functions comprising deterministic branch instructions (step 1330). The evolved fingerprint key 250 can be stored in the stack, in memory, etc. System 10 combines the evolved fingerprint keys 250 to form the fingerprint mark, FM, 245 (step 1335).

The protected copy 45 is successful in defending attacks such as, for example, an additive attack, a distortive attack, a collusive attack, or a subtractive attack. In an additive attack, an adversary embeds an additional watermark in the protected copy 45 so as to cast doubt on the origin of the intellectual property. An attacker is successful even if the original mark remains intact; however, the attacker considers it more desirable to damage the original mark. The watermarking module 225 is successful at thwarting an additive attack even if a different watermarking scheme is used to embed the second watermark.

The protected copy 45 is successful at defending against the additive attack because of the use of the fingerprint branch function 240, the integrity check branch function 235, or the branch function 215. The displacement table, T, 230 stores a displacement to the next instruction, therefore any transformation applied to a function that alters the displacement between a branch instruction and its target instruction without updating the displacement table, T, 230 causes the fingerprint branch function 240, the integrity check branch function 235, or the branch function 215 to return to an incorrect instruction. Consequently, any modification made to the protected copy 45 by inserting additional watermark code that alters the displacements yields a non-functional program.

Furthermore, the protected copy is successful at defending against the additive attack because of the use of the integrity check module 220. The integrity check module 220 monitors execution of the protected copy 45, thus detecting any modifications made by embedding an additional watermark in the protected copy 45.

In a distortive attack, an attacker applies a series of semantics-preserving transformations to the protected copy 45 in an attempt to render a watermark such as the authorship mark, AM, 255 or the fingerprint mark, FM, 245 useless. The attacker wishes to distort the protected copy 45 in such a way that the watermark becomes unrecoverable while the functionality and performance of the protected copy 45 remain intact. As with the additive attack, a distortive attack cannot succeed in yielding a fully functional protected copy 45 that no longer contains the watermark. Any change in the code of the protected copy 45 either trips an integrity check or alters a displacement to a target instruction, causing the protected copy 45 to produce incorrect results.

A collusive attack occurs when an adversary obtains more than one copy of the protected copy 45, each with a different fingerprint mark, FM, 245. The attacker compares the copies in an attempt to isolate the fingerprint mark, FM, 245. With conventional watermarking algorithms, prevention of a collusive attack is addressed through the use of code obfuscation. Code obfuscation applies different sets of obfuscations to the fingerprinted program, making the code different throughout the fingerprinted program rather than just at the fingerprint mark. While this is a viable option for thwarting a collusive attack, code obfuscation incurs a noticeable performance overhead and increases the size of the fingerprinted program.

The protected copy 45 is highly resistant to the collusive attack without the use of obfuscation. The only difference between two differently fingerprinted copies of the protected copy 45 is the order of the values in the displacement table, T, 230. Consequently, an attacker has to carefully examine the data section of each of the differently fingerprinted copies of the protected copy 45 to identify a difference.

Collusive attacks can be further thwarted through the use of the integrity check module 220. The integrity check module 220 recognizes the use of a debugger and causes the program to fail in the case of an attack. In a dynamic attack, the only difference the adversary can detect is the value of the fingerprint key 250 that is evolved to yield a different slot in the displacement table, T, 230. If an adversary is able to launch a successful collusive attack, extensive manual analysis in the form of a subtractive attack is required to remove the fingerprint mark, FM, 245.

In a subtractive attack, an attacker attempts to completely remove a watermark such as the authorship mark, AM, 255 or the fingerprint mark, FM, 245 from the disassembled or decompiled code of the protected copy 45. If the attacker is able to identify which sections of code in the protected copy 45 are generating the fingerprint mark, FM, 245, the attacker then has to manually analyze the protected copy 45 to identify all of the call instructions that are converted branch instructions. The attacker then has to identify the correct target instruction and replace the call with the correct branch instruction and displacement.

If the attacker only converts those branch instructions responsible for generation of the fingerprint mark, FM, 245 and does not also convert the other branch instructions, the protected copy 45 fails to execute properly. The protected copy 45 fails because the decoy branch functions are designed as a check and guard system. One of the duties of the check and guard system is to verify that the fingerprint branch function has not been altered or removed. Consequently, removal of the fingerprint branch function 240 also requires removal of the decoy branch functions. The manual analysis required to accomplish such a task is extensive.

It is to be understood that the specific embodiments of the invention that have been described are merely illustrative of certain applications of the principle of the present invention. Numerous modifications may be made to the system, method, and service for detecting improper manipulation of an application described herein without departing from the spirit and scope of the present invention. Moreover, while the present invention is described for illustration purpose only in relation to an application, it should be clear that the present invention is applicable as well to, for example, any executable software code, such as Java bytecode.

More specifically, each programming language places different restrictions on the capabilities of the language, the structure of the produced code, and the functionality. An alternative embodiment of the protection mechanism relies on the use of an interface and explicitly thrown exceptions. The main difference between the previously described protection mechanism and this alternative embodiment is in the manner in which the fingerprint branch function transfers execution control. Previously, the table stored displacements. In the Java version the table stores objects. The Java fingerprint branch function looks up an object in an array and then calls that method's branch function. The purpose of the function branch is to throw a unique exception. Once the exception is thrown, it will be propagated up to the method that invoked the fingerprint branch function. When this occurs, the invoking method will find the exception in its exception table and transfer control to the instruction specified. This instruction is the target of the converted branch.

The Java fingerprint branch function performs the following:

An integrity check producing a value $v_i$.

Generation of the next method key, $k_i$, through the use of a one-way function, $k_i = g(k_{i-1}, v_i)$.

Object look up through the use of a table, the key, and a hash function, A $a=T[h(k_i)]$.

Call the method branch using the object a, a.branch( ).

The main idea of the fingerprint branch function is the similar to what has been described earlier. The function still performs and integrity check, evolves a key, and eventually transfers execution back to the calling function, but the means for accomplishing this are different.

In order to perform the fingerprint calculation, an interface, A, is added to the program. A must specify at least one branch method. Additionally, n classes A1, A2, . . . , An are added to the program which each implement the interface A. The branch method in each of the Ai classes will throw a unique exception. A table of objects which are subclasses of A is also inserted, so a combination of objects A1, . . . , An. This table is inserted in the form of an array T. The order of the objects in T is determined in the same manner as the displacement table in the previously described protection mechanism. A key aspect of this fingerprint branch function is the use of the interface. Because the object a is being instantiated as type A, which is an interface, the method lookup for branch will be dynamic and occur at runtime.

In the previous protection mechanism all conditional and unconditional branch instruction are replaced. In this alternative embodiment, only the goto and conditional branches are replaced, and the method call instructions are not replaced or the instructions in Java invoked, because the target listed in the exception table must be an instruction within the method. Only those branches on the deterministic path can be used to call the fingerprint branch function. This restriction is necessary for the same reason as with the previously described protection mechanism.

Another important aspect of the Java branch based watermark is that for each converted branch, n entries must be added to the exception table. One of the entries is the correct target and n−1 are decoys. If the decoy exception entries are omitted then the branch, target pairs become obvious. During the Java verification process exception edges are considered a possible path when checking for consistent stack height, that local variables have been initialized, etc. Thus, the targets of the decoy exceptions must be chosen such that the bytecode will still pass the Java verifier.

What is claimed is:

1. A method for detecting improper manipulation of an application containing a plurality of executable branch instructions, comprising:
   executing the application using a secret input to obtain a trace of the application;
   identifying, from the trace, a set of deterministic branch instructions;
   selecting at least one of the branch instructions from the set of deterministic branch instructions;
   converting the selected branch instruction to a control transfer instruction that calls upon a fingerprint branch function;
   adding a watermark to the application in order to identify an authorized user;
   generating a fingerprint mark to the application;
   generating a fingerprint key associated with the fingerprint mark;
   as the application is executing, upon encountering a call to the fingerprint branch function, executing the fingerprint branch function to evolve the fingerprint key and an integrity check value associated with the evolved fingerprint key;
   replacing at least one branch instruction corresponding to a conditional jump and at least one branch instruction corresponding to an unconditional jump in the application to alter control flow of the application; and
   calculating a hash function responsive to a return address of the at least one branch instruction corresponding to the conditional jump and the at least one branch instruction corresponding to the unconditional jump and a starting address of the fingerprint branch function;
   wherein the fingerprint branch function corresponds the evolved fingerprint key with a location in a displacement table to locate a displacement for a target instruction at the location in the displacement table within the application and subsequently a return location of the target instruction is computed within the application by adding the displacement to a return address of the control transfer function that calls upon the fingerprint branch function, and execution control is returned to the target instruction at the computed return location within the application, and
   wherein upon improper manipulation of the application, the fingerprint branch function evolves a wrong key that prevents a normal execution of the application by corresponding the wrong key with an incorrect location within the displacement table, thereby causing an incorrect return location to be calculated by adding an incorrect displacement retrieved from the incorrect location to the return address and causing the execution control to be returned to the target instruction at the incorrect return location within the application.

2. The method of claim 1, wherein the watermark comprises an authorship mark in order to identify an owner of the application.

3. The method of claim 1, further comprising performing an integrity check in order to determine whether the application has been improperly manipulated.

4. The method of claim 1, wherein the fingerprint mark comprises one or more fingerprint keys; and wherein each fingerprint key uniquely identifies an associated authorized user and application.

5. The method of claim 1, wherein upon executing the control transfer instructions, each call instruction evolves a different fingerprint key.

6. The method of claim 2, wherein the authorship mark comprises two or more prime factors to prevent improper discovery of the authorship mark.

7. The method of claim 2, wherein the authorship mark is encoded in the fingerprint branch function.

8. The method of claim 2, wherein the authorship mark proves ownership of the application through the use of an authorship key.

9. The method of claim 4, further comprising assigning an initial value for the fingerprint keys upon registration of the application by an authorized user.

10. The method of claim 1, wherein the fingerprint branch function locates a displacement in a displacement table, said displacement representing a difference in a location in code of the application from a selected branch instruction to the target instruction, and
   wherein the fingerprint branch function transfers an execution control to the target instruction.

11. A method for detecting improper manipulation of an application containing a plurality of executable branch instructions, comprising:
   selecting at least some of the branch instructions;
   converting the selected branch instructions to control transfer instructions that call upon an integrity check branch function;
   constructing a static structure comprising a displacement entry for each of the selected branch instructions and a corresponding target instruction;
   using a hash function to assign a unique identifier to a location of each of the selected branch instructions;
   embedding a fingerprint mark and an authorship mark into the selected branch instructions;
   as the application is executing, upon encountering a call to the integrity check branch function, generating a value used to obtain information from the static structure about an instruction to execute after the integrity check branch function completes;
   identifying the integrity check branch function as fingerprinted with the fingerprint mark; and
   identifying if the application has been subjected to a semantic-preserving transform or a debugger was used during the executing; and
   preventing normal execution of the application if said generation results in a wrong value based on an integrity value associated with the fingerprint mark, thereby causing an incorrect displacement entry located at a location within the static structure that corresponds with the wrong value to be retrieved from the static structure and an incorrect return location within the application to be computed based on the incorrect displacement entry that would cause the application to jump to the incorrect return location within the application,
   wherein the information obtained from the static structure is used to compute a return location within the application of the instruction to be executed after the integrity check branch function completes.

12. The method of claim 11, selecting the branch instructions comprises selected the branch instructions that are on a non-deterministic path.

* * * * *